(12) United States Patent
Straka et al.

(10) Patent No.: US 10,786,830 B1
(45) Date of Patent: Sep. 29, 2020

(54) SUPERHYDROPHOBIC AND DUST MITIGATING COATINGS

(71) Applicant: United States of America as represented by the Administrator of NASA, Washington, DC (US)

(72) Inventors: Sharon A. Straka, Greenbelt, MD (US); Mark M. Hasegawa, Greenbelt, MD (US); Kenneth M. O'Connor, Greenbelt, MD (US); Victoria J. Stotzer, Greenbelt, MD (US)

(73) Assignee: United States of America by the Administrator of NASA, Washington, DC (US)

( * ) Notice: Subject to any disclaimer, the term of this patent is extended or adjusted under 35 U.S.C. 154(b) by 0 days.

(21) Appl. No.: 16/215,040

(22) Filed: Dec. 10, 2018

Related U.S. Application Data

(63) Continuation-in-part of application No. 14/502,339, filed on Sep. 30, 2014.

(Continued)

(51) Int. Cl.
| | |
|---|---|
| *B05D 5/08* | (2006.01) |
| *B05D 3/00* | (2006.01) |
| *B05D 3/02* | (2006.01) |
| *B05D 3/10* | (2006.01) |
| *B05D 7/00* | (2006.01) |
| *C09K 3/18* | (2006.01) |
| *C08K 3/36* | (2006.01) |
| *C08L 23/28* | (2006.01) |

(Continued)

(52) U.S. Cl.
CPC ............ *B05D 5/083* (2013.01); *B05D 3/002* (2013.01); *B05D 3/0254* (2013.01); *B05D 3/105* (2013.01); *B05D 7/51* (2013.01); *C08K 3/36* (2013.01); *C08L 23/28* (2013.01); *C09K 3/18* (2013.01); *C09K 3/22* (2013.01); *B05D 2203/35* (2013.01); *B05D 2504/00* (2013.01); *B05D 2601/22* (2013.01); *C08K 2201/011* (2013.01); *C08L 63/00* (2013.01)

(58) Field of Classification Search
CPC ...... B05D 5/083; B05D 3/002; B05D 3/0254; B05D 3/105; B05D 7/51; B05D 2203/35; B05D 2504/00; B05D 2601/22; C08K 3/36; C08K 2201/011; C08L 23/28; C08L 63/00; C09K 3/18; C09K 3/22
See application file for complete search history.

(56) References Cited

U.S. PATENT DOCUMENTS

| | | | | |
|---|---|---|---|---|
| 2013/0095290 A1* | 4/2013 | Muisener | ............ | C09D 5/1693 428/141 |
| 2017/0120294 A1* | 5/2017 | Portet | ...................... | B05D 5/08 |

* cited by examiner

*Primary Examiner* — James M Mellott
(74) *Attorney, Agent, or Firm* — Matthew F. Johnston; Bryan A. Geurts; Helen M. Galus

(57) ABSTRACT

A system, apparatus, composition and method employing a dust mitigation coating that also mitigates or repels water, ice, and other liquids. Techniques to coat the surfaces of equipment and items with these dust, liquid, and ice mitigation coatings, minimizing or eliminating mission problems caused by dust, liquid, or ice accumulation, particularly in outer space or on another planetary body or moon. Further, the dust mitigation coatings should exhibit a Lotus-like effect, making the coated surfaces ultra-hydrophobic. The present invention is also directed to techniques for improving the functioning of terrestrial-based equipment and systems where dust, liquid, or ice accumulation is a problem, such as in hospitals and other health contexts to prevent contamination.

1 Claim, 15 Drawing Sheets

---

840 — Vacuum deposition layer: fluorinated ethylene propylene — 835

830 — Self-assembling monolayer: 1H, 1H, 2H, 2H-perfluorodecyltriethoxysilane — 825

820 — Nano-texture: epoxy basecoat with silica nanoparticles — 815

810 — substrate or component — 805

Related U.S. Application Data

(60) Provisional application No. 62/728,983, filed on Sep. 10, 2018.

(51) Int. Cl.
 *C09K 3/22* (2006.01)
 *C08L 63/00* (2006.01)

1. Tap Water
2. Salt Water %10
3. Arizona Dust %5
4. Wind Shield Washer Fluid
5. Antifreeze
6. Power Steering Fluid
7. Windex
8. Car Wax
9. Coffee with Cream and Sugar
10. Gasoline
11. Diesel
12. Armor All
13. Sun Screen
14. Anti Mosquito
15. Hand Lotion

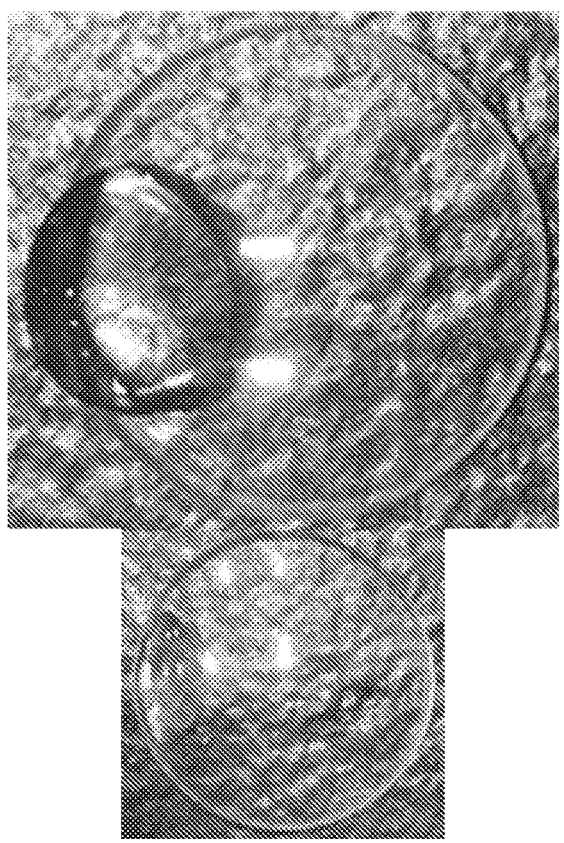
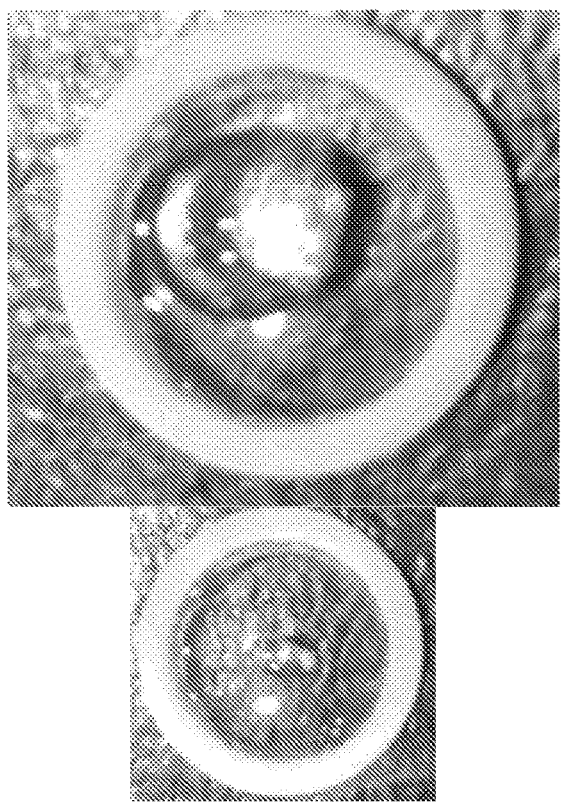
FIG. 18B
FIG. 18A

Sample Number: WC2

Very little Traces of salt remained on the glass after the glass was allowed to dry in room temperature

SUPERHYDROPHOBIC AND DUST MITIGATING COATINGS

CROSS REFERENCE TO RELATED APPLICATION

This application claims the benefit of U.S. application Ser. No. 14/502,339 entitled "SYTEM, APPARATUS, COMPOSITION AND METHOD FOR SUPERHYDROPHOBIC AND DUST MITIGATING COATINGS" filed on Sep. 30, 2014 and provisional application 62/728,983 entitled "SUPERHYDROPHOBIC AND DUST MITIGATING COATINGS" filed on Sep. 10, 2018; each are hereby incorporated herein in its entirety.

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

Field of the Invention

The present invention is in the technical field of coatings and other surfaces that mitigate or repel dust, other particulates, water, ice, and other liquids. The principles of the present invention are applicable to surfaces on apparatuses and in systems for commercial or scientific use, for space and planetary explorations, and for terrestrial uses, such as aeronautics, automotive, electronics, energy production, health-related, and ultra-pure environments.

Description of Related Art

The exploration of space requires people and equipment to uncover further mysteries of the Universe and its workings. One of the hazards of working on the moon is regolith or dust covering all surfaces. Dust problems are also pervasive on missions to Mars, asteroids, comets, and other planetary bodies. Indeed, the unknown health effects of moon dust were a great concern to the Apollo astronauts, NASA researchers and Mission Control.

Data from the Apollo missions also show that the dust conditions on the surface of the moon substantially degraded the performance of the astronauts' extra-vehicular suits (EVSs), the extra-vehicular activities (EVAs) tools, mechanisms, spacecraft thermal control surfaces and optical surfaces. Indeed, lunar regolith, in addition to being microscopic, is electrostatically charged and has jagged edges, making the dust extremely difficult to remove from any surfaces. The Apollo astronauts found that the dust transported and adhered everywhere, even throughout the interior habitations areas. Further, the astronauts identified dust accumulation on EVA suits and tools as a major problem that restricted motion, and data collection, i.e., mission performance was degraded, and presented health concerns.

Dust control techniques developed during the Apollo missions were only partially successful due to NASA scientists not entirely understanding the dust problems, and ground testing underestimating the problem. The more recent Mars land rover missions provided NASA scientists with information concerning how Martian dust can cause damage to mechanisms and, like moon dust, adversely affect mission performance, e.g., decommissioning the Mars Exploratory Rover Spirit recently. Martian dust has thus been identified as a major problem for future missions, including the ultimate human colonization of Mars. Accordingly, these historical data have resulted in NASA efforts, such as those of the Applicants as set forth in the instant application, to identify dust mitigation as a target area for all future Lunar and Martian missions.

Additionally, NASA develops and launches contamination sensitive missions, whereby particulate, liquid, and ice accumulation can degrade science or mission performance on orbit. This problem can limit the life of a mission. This is a particular concern on missions with contamination sensitive surfaces, such as optics, detectors, lasers systems, cryogenics, large scale optics, radiators, or any surface that cannot be cleaned or on surfaces that need protection from water and ice buildup.

Furthermore, since particulate, liquid, and ice accumulation is a problem in various terrestrial industries as well, e.g., in clean environments, the need for better control of dust and other particulates, liquids, ice accumulation, and contaminants is manifest, e.g., hospitals, microprocessor manufacturing, textile performance, automotive performance, solar array and wind turbine energy production, pharmaceutical manufacturing, aeronautical applications, clean rooms, etc. Since the regolith and dust in general adversely affect health, the amelioration of this problem is necessary for future, long-duration space missions and explorations, as well as in more Earthly-based applications. Indeed, there is an immediate need for dust, liquid, and ice mitigation in numerous terrestrial contexts, as discussed further herein below. There is, therefore, a need for systems, equipment, compositions and methods that provide dust, liquid, and ice mitigation or suppression capabilities, and that the combination be able to function properly in difficult and extreme situations and environments, whether on earth, in space or on another world.

SUMMARY OF THE INVENTION

The present invention is directed to a method employing enhanced lotus-like effect through super-hydrophobic coated surfaces to mitigate against the contamination or accumulation of dust, liquid, ice and other debris. Additionally, the present invention is directed to techniques to coat the surfaces of optical components and other equipment with hydrophobic and super-hydrophobic coatings, minimizing or eliminating dust, liquid, and/or ice contamination or accumulation problems during missions in hostile environments, particularly, in outer space or on another planetary body or moon, not excluding earth. Further, the hydrophobic and super-hydrophobic coatings exhibit an enhanced "lotus-like" effect by the combination of various processes layering nano-particle filled epoxy basecoats, self-assembling monolayer, epoxies, and epoxy resins. The present invention is also directed to techniques for improving the functioning of terrestrial-based equipment and systems where dust, liquid, or ice contamination or accumulation is a problem. Terrestrial-based equipment may be used in a wide range of applications such as, but not limited to the automotive, pharmaceutical, aeronautical, health, clean-room, energy production, cryogenic, and textile industries, to prevent contamination or accumulation of dust, liquid, and ice.

BRIEF DESCRIPTION OF THE DRAWINGS

While the specification concludes with claims particularly pointing out and distinctly claiming the subject matter that is regarded as forming the present invention, it is believed that the invention will be better understood from the following Detailed Description, taken in conjunction with the accompanying DRAWINGS, where like reference numerals designate like structural and other elements, in which:

FIG. 18*a* and FIG. 18*b* is a comparison between a rear-backing automotive camera lens cover that is uncoated (FIG. 18*a*) and a rear-backing automotive camera lens cover that is coated with an embodiment of present invention (FIG. 18*b*). The coated lens cover (FIG. 18*b*) repels the water droplet due to present invention's nano-texture and hydrophobic properties;

DETAILED DESCRIPTION OF THE INVENTION

The present invention will now be described more fully hereinafter with reference to the accompanying Drawings, in which preferred embodiments of the invention are shown. It is, of course, understood, however, that this invention may be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

Dust is ever-present and problematic both on Earth and elsewhere. Certain environments require the absence or reduction of dust in order to be able to function, e.g., in microprocessor, manufacturing, clean rooms and other ultra-clean facilities, where the dust is harmful to the products. As discussed herein above and herein below, however, the mitigation of dust is useful in many contexts, including the health context, whether on Earth or another heavenly body.

NASA has been at the forefront in mitigating the problems with contamination or accumulation of dust, liquid, and ice for decades. Various problems in regolith or dust particle accumulation have been directly found during lunar explorations by Apollo astronauts. In particular, analysis has shown that lunar dust exhibits physical properties that make the dust strongly adhere to any surfaces. Similarly, Mars also has dust with strong adherence properties, but, unlike the Moon, Mars has an atmosphere. Through long observations and in the rover explorations, Mars is known to have severe dust storms, making all equipment on the surface quite vulnerable to dust accumulation. The Mars Exploration Rover Spirit was lost recently due to dust accumulation on the solar panels. Although the instant invention has been developed primarily in the context of space exploration and the hazards thereof, dust, particulates, liquid, and ice contamination or accumulation are not desired in numerous terrestrial contexts as well, making the solutions set forth in the present invention applicable universally.

Figure 1:
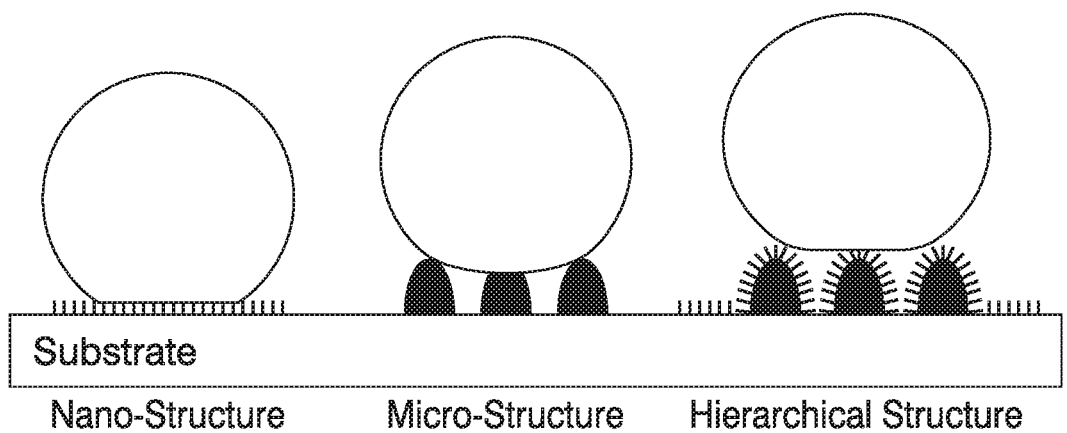
FIG. 1 is an illustration showing a droplet of a liquid or particle on the surface of a substrate coated with nano-structures (left), with microstructures (middle), and hydrophobic surface coating hierarchical structure combining micro-structures with nano-structure (right)
Figure 2:
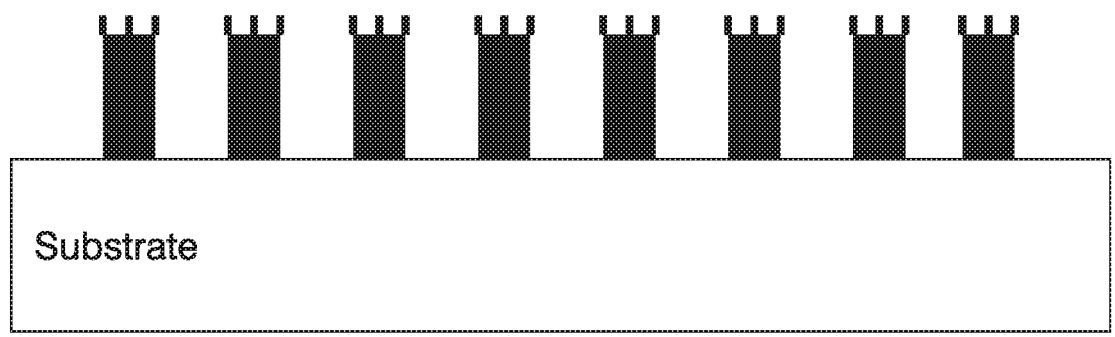
FIG. 2 is an illustration an idealized structure of nano-textured micro pillars only attainable in a laboratory, but not viable for large manufacturing scale production.

A purpose of the present invention is to address a large scale problem of dust contamination and accumulation in dusty space environments, such as the moon, Mars, comets, asteroids, and other planetary bodies. Additionally, diverse coatings were developed to mitigate contamination or accumulation on missions where sensitive surfaces, such as large scale optics, cannot be cleaned or on surfaces that need protection from particulate, liquid, and ice buildup. Indeed, the present invention is a cross-cutting technology development that achieves self-cleaning hydrophobic and super-hydrophobic properties with particulate contact surface angles greater than 100 degrees. Hydrophobic and super-hydrophobic surface properties can be used on any mission or application where dust/particle contamination or accumulation degrades science or mission performance. The beneficial properties of the instant invention also have other applications, such as covering the interior of human habitats to minimize long-term contamination and debris build-up. Additionally, the coatings of the present invention are also suitable for other purposes within NASA and commercially. The concept of a Lotus coating, a dust mitigation coating, or hydrophobic coating is found in nature. The name "Lotus coating" addresses various hydrophobic and dust mitigation coatings. However, the present invention resolves limitations of current hydrophobic coating surfaces that are not operable for NASA space qualification standards and requirements, which factors in durability of coating, stability in space environment (vacuum, ultra violet, radiation, high-temperature, material degradation, outgassing, etc. . . . ), reproducibility, quality control, transmissivity, adhesion, and material application processes. Conventional high temperature commercial processes destroy substrates rendering them unusable for the contemplated purpsesof the present invention. The present invention maintains its self-cleaning hydrophobic and super-hydrophobic coating properties despite the harsh space environment and space-born particulates' high adhesion properties. NASA space qualified hydrophobic and super-hydrophobic surfaces were achieved, per FIG. 1, with the use of hierarchical structure where micro-structures are coupled with nano-structures coatings to achieve the optimal surface contact angles. The invention herein overcomes the limitations of small-scale laboratory grown close to idealized nano-textured micro pillars, per FIG. 2, to easier to scale up for large scale manufacturability of coatings with the use of randomly sized nano-particles coatings, per FIG. 3.

Prior art efforts over the past few years have resulted in various coatings that have hydrophobic or dust mitigation characteristics. These other techniques, however, require high temperatures to produce and apply, such as in combustion chemical vapor deposition (CCVD). The CCVD technique can damage or destroy sensitive spaceflight substrates, such as polyimide films. Furthermore, testing showed that prior art coatings produced by these other techniques were inconsistent and failed to survive harsh space flight environments. Additional efforts in wet chemistry formulations were also problematic, e.g., they involved hazardous chemicals and waste, required spin coating which creates uniformity issues and limits substrate size, or required high temperatures, which put the viability of the substrates at risk.

The methods of the present invention have eliminated the use of hazardous materials by utilizing more user-friendly chemicals and safer procedures. The present invention also eliminated high temperature bakes, such as those experienced when creating nano-textures from polystyrene spheres, and high temperature exposures experienced during application processes utilizing CCVD techniques. Avoiding such high temperature bakes facilities more u=uniform nanpoparticles' reduced multi-sized nanoparticles. Furthermore, the techniques of the present invention are applicable for spray coating surfaces, as well as brush coating, rub coating, spin coating, vacuum deposition, plasma etching or a combination herein.

The coatings of the present invention are durable enough to survive harsh space flight environments. The techniques of the instant invention also have to be extremely scalable in order to apply the coating to small surfaces, such as solar cells or lenses, as well as extremely large surfaces, such as human space habitats. The coatings and the applications processes thus have to possess characteristics that do not compromise the underlying hardware surfaces. For space applications, these coatings must be durable and wear-resistant, be able to be applied to large surfaces, optically clear for optics, transparent in the infrared wavelengths for thermal control surfaces, exhibit low outgassing properties, stable in UV environments, and resistant to most solvents, yet be able to mitigate dust accumulation or prevent water or ice build-up.

The Lotus coating technique of the present invention utilizes a low temperature application process, from 75° C. to 125° C., thereby preventing or eliminating surface damage to the underlying substrate. The coatings should also be stable under low vacuum environments, from $10^{-5}$ Torr to 100 Torr, in space radiation environments and charged particle environments, under extreme ultra violet conditions, and under thermal cycling. Most importantly, these coatings must prevent particles and ice from adhering and must repel liquids. As mentioned, prior art techniques employ high temperature bakes or cures that may damage sensitive space flight hardware, utilize hazardous chemicals or processes, only coat small-scale surfaces through spin coating, and lack reproducibility, coating uniformity, or coating stability in space. Additionally, these prior art coatings applied through a combustion chemical vapor deposition (CCVD) process requiring a high temperature application, is scale limited, had reproducibility issues, and damaged spaceflight materials during application. The coatings and techniques of the present invention have thus been developed and overcome drawbacks of the prior art.

Dust mitigation coatings have, accordingly, been developed as a countermeasure for addressing the aforementioned problems of dust accumulation, such as for long-duration human space exploration on the Moon or Mars. In particular, the coating of the instant invention accomplishes dust mitigation with the coating's nano-textured surface. The coating reduces the surface energy of the underlying surface, as well as the surface area, which in turn drastically reduces the adhesion of particles and ice and repels liquids.

Figure 4:
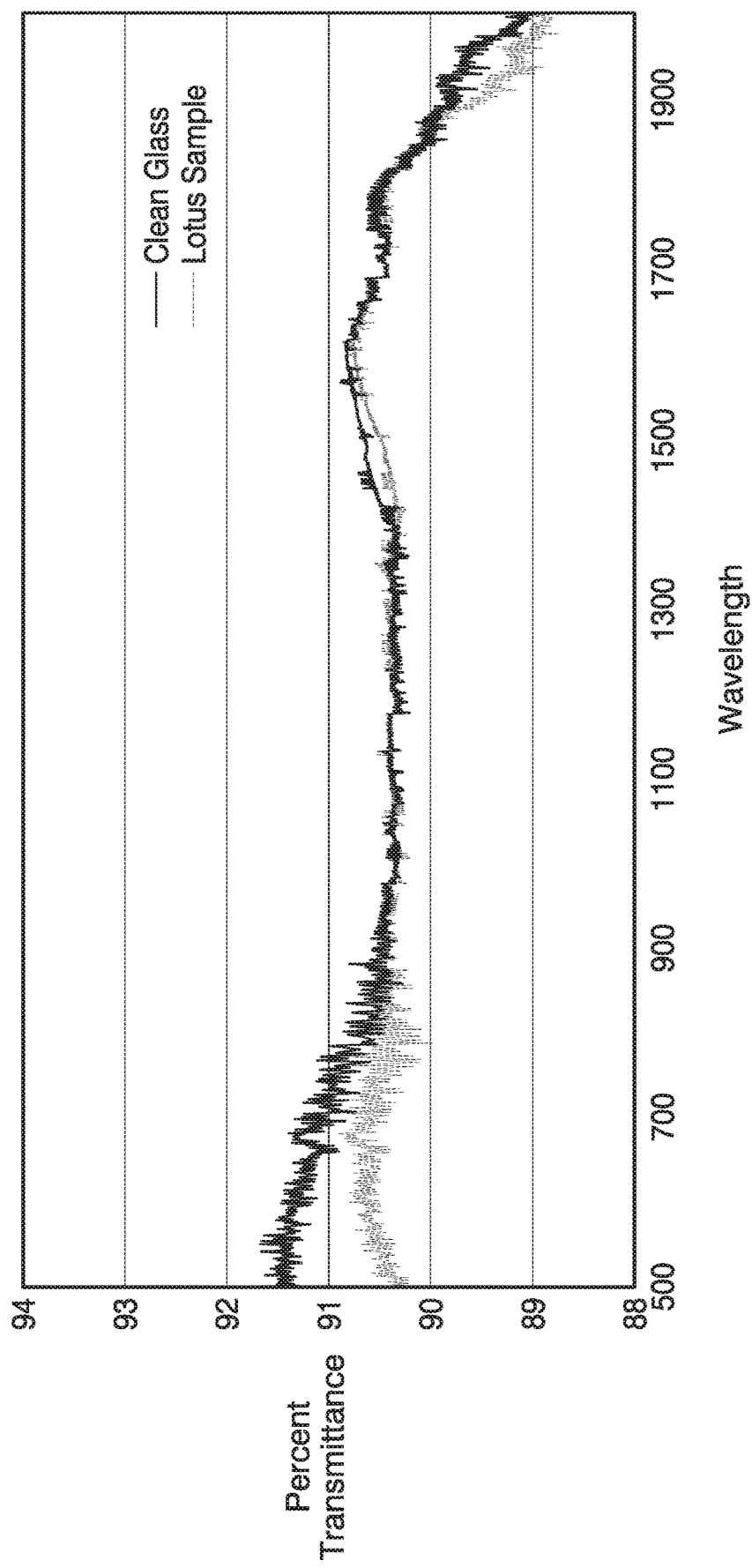
FIG. 4 is a transmittance test with a Cary 5000 spectrophotometer where an embodiment of the present invention's hydrophobic coating with surface angle of 148° on a glass substrate is optimized at a specific wavelength to match the transmittance of a clean glass substrate.

As noted, the present invention is generally based upon the naturally occurring anti-contamination and water repellant surface properties of the Lotus plant leaf. In particular, the Lotus coatings of the present invention have a nano-textured surface similar to that exhibited by the Lotus plant leaf. As mentioned hereinabove, this nano-texture sheds dust and repels water by reducing surface energy and contact surface area. Table 1 shows a durability test where an optical coating hardness kit, per MIL-C-00675, was used to apply both 2 lbf of cheesecloth and 5 lbf of eraser unto a sample treated with the herein invention's super-hydrophobic coating. In both tests, the super-hydrophobic coated sample maintained its super-hydrophobic properties where contact angles remained greater than or equal to 150° after at least 6 passes of the material onto the coated surface. In addition, FIG. 4 shows transmittance test results with a Cary 5000 spectrophotometer where a clean glass substrate was compared to a glass substrate coated with an embodiment of the present invention's hydrophobic coating that achieved a contact angle of 148°. Per FIG. 4, the hydrophobic coating was optimized at a specific wavelength to exhibit the same transmittance as the clean glass substrate. Finally, the embodiment of the present invention's super-hydrophobic coating was placed in a high vacuum chamber to observe the durability of the coating's contact angle in a space environment. When the substrate with the super-hydrophobic coating was exposed to a pressure of approximately $10^{-6}$ Torr at room temperature for four weeks in a VEECO™ chamber, there were no observable change in appearance or in the contact angle of the coated substrate. The super-hydrophobic lotus coated substrate initially measured contact angles between 153° to 150° after exposure to the cheesecloth test, and initial contact angles between 154° to 145° after exposure to the eraser test.

TABLE 1

Durability Test Results

| 2 lbf Cheesecloth | | 5 lbf Eraser | |
| --- | --- | --- | --- |
| Pass | Contact Angle | Pass | Contact Angle |
| 0 | 153° | 0 | 154° |
| 1 | 153° | 1 | 146° |
| 2 | 151° | 2 | 151° |
| 3 | 150° | 3 | 145° |
| 4 | 151° | 4 | 151° |
| 5 | 150° | 5 | 151° |
| 6 | 150° | 6 | 152° |
| 7 | 151° | 7 | 147° |
| 8 | 151° | 8 | 145° |

It should be understood that the principles of the present invention may be made applicable in a wide range of situations, not necessarily the extremes of space exploration, the subject of many of the studies herein. Indeed, the present invention may be employed not only in Earth's (or other extraterrestrial bodies') atmospheres, but also in countless terrestrial-based applications.

Indeed, the present invention includes an innovative coating that can be used to address a number of contamination related concerns. As discussed, the coating reduces the surface energy of the underlying surface, as well as the surface area, which in turn drastically reduces the adhesion of particles and ice and repels liquids. This formulation is thus more durable than the aforementioned previous formulations, and does not significantly reduce transmission. The instant invention can be applied to both metallic and non-metallic surfaces. The coating is vacuum compatible and can survive the harsh space environment. The coatings of the instant invention are easily cleanable using standard solvents or water.

There is a tremendous need for a flight-qualified, particulate, liquid, and ice mitigation coating that can survive extremely harsh space and aeronautical environments, as well as terrestrial environments. The coatings of the present invention thus help ensure mission performance when performing science and technology missions in potentially dusty terrains or in wet or ice-forming environments.

The present invention can also be easily adapted or modified to satisfy the requirements of a specific application. Depending on requirements, the coating systems of the present invention are more easily tailored to specific applications or environments than previous methods of the prior art. This customization makes the present invention far more adaptive, allowing for a more diverse range of applications. The adaptability of the coating embodiments of the present invention allow applicability to a variety of surfaces, such as, but not limited to, radiators, solar arrays, optics and lenses, reflectors, thermal control blankets, astronaut suits, habitat enclosures, fluid transport systems, launch vehicles, seals and gaskets, mechanisms, protective covers, laser systems, etc.

As noted, missions to the moon, Mars, and other celestial bodies would greatly benefit from this technology development. By prioritizing the transmittance of the coating, the coatings and techniques of the present invention could be tailored for large scale optics that cannot be cleaned after integration to minimize particulate fall-out and keep the mirror clean during ground processing and launch. The present invention is able to address a major challenge for space exploration and for other cross-cutting missions where particulate, condensation, or ice accumulation causes performance degradation. The present invention also has aeronautical applications such as, but not limited to, preventing ice buildup on airplane wings and in airplane flap mechanisms. Additionally, the coating could be utilized in mitigating potential health and safety issues by controlling and reducing the amount of particles and repelling liquids in human habitation areas, such as the International Space Station or future exploration habitats.

Embodiment 1: Transparent Lotus Coating Suitable for Optics (WC2)

Figure 3:
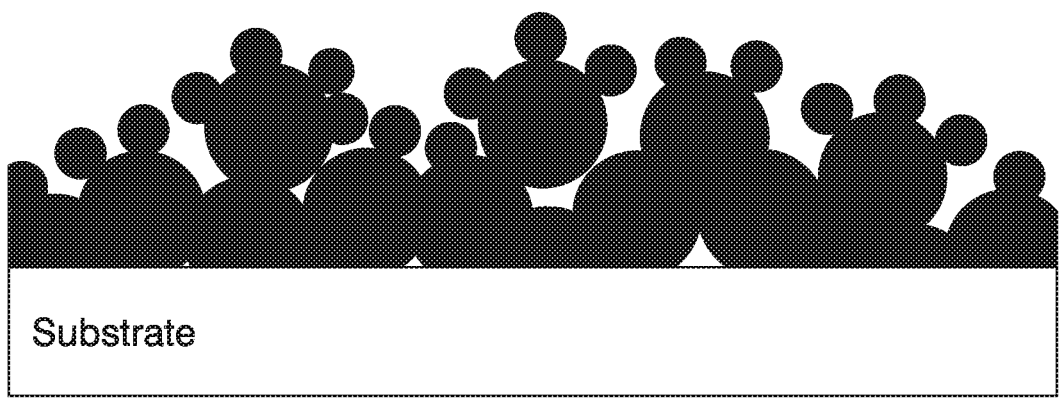
FIG. 3 is an illustration a "lotus-like" structure of the present invention with different sized nano-particles that is scalable for large manufacturing production or application showing the designed texture, nano-particle clumping effect and hierarchical structure.
Figure 5:
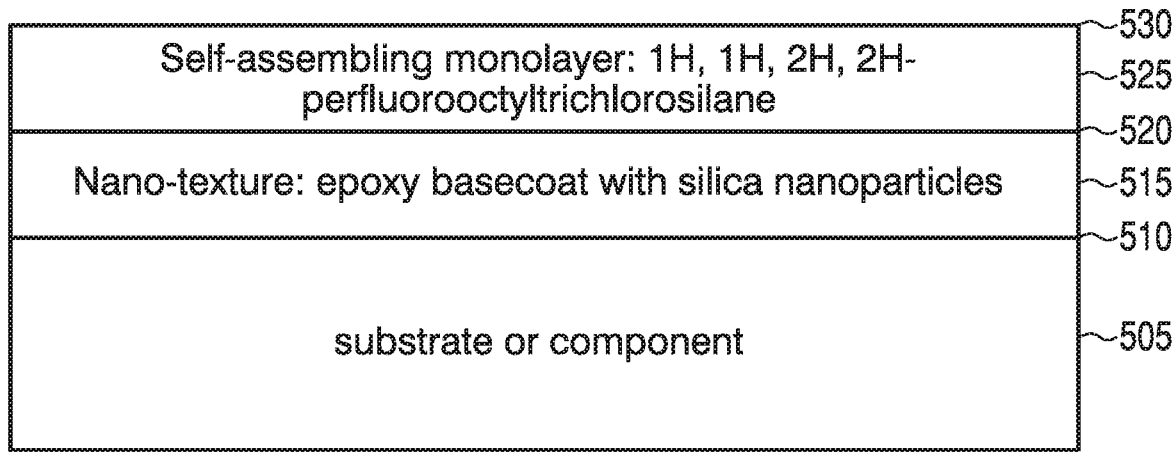
FIG. 5 is an illustration of an embodiment of a transparent lotus coating where the reference numerals 515 and 525 depict the coating layers, and the reference numerals 510 and 520 depict the interfaces between the coating layers and the reference numeral 530 depicts the exterior surface of the coating.
Figure 6:
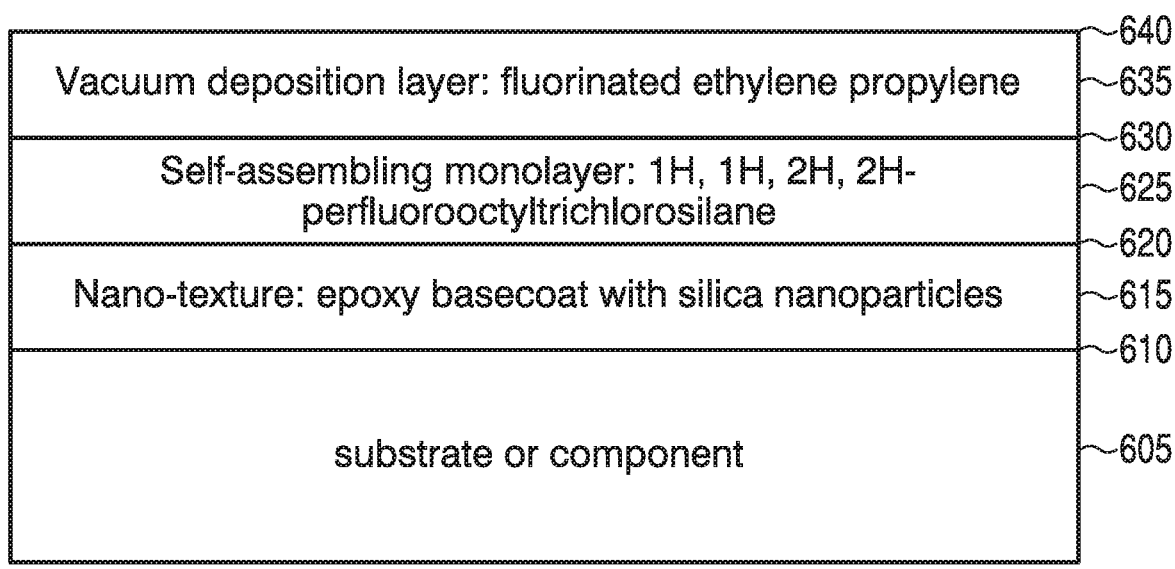
FIG. 6 is an illustration of an embodiment of the transparent lotus coating with vacuum deposition layer where the reference numerals 615, 625, and 635 depict the coating layers, and the reference numerals 610, 620, and 630 depict the interfaces between the coating layers and the reference numeral 640 depicts the exterior surface of the coating.

FIG. 5. shows a transparent lotus coating suitable for optics according to one embodiment of the present invention, wherein the lotus coating does not require a primer layer. The epoxy basecoat with nanoparticles produces a nano-textured surface and preferably utilizes several sizes of nano-particles to produce a clumping effect as illustrated in FIG. 3. A self-assembling monolayer is then applied to make the coating hydrophobic (water droplet contact angles greater than 90°) or super hydrophobic (water droplet contact angles greater than 150°).

First, the nano-texture epoxy basecoat 515 (epoxy basecoat) is created by mixing 0.1 g of silica nanoparticles in an 8:1 ratio of 15 nm particles to 80 nm particles by mass to 4 ml of 4-to-1 TAP epoxy resin, 1 ml of 4-to-1 TAP epoxy hardener, and 40 ml of Optima™ grade acetone. The Optima™ grade acetone is used to dilute the mixture of the epoxy basecoat 515. The epoxy basecoat 515 produces the nano-texture and preferably utilizes several sizes of nano-particles to produce a clumping effect to the texture. It should be understood that other sized nanoparticles can be used, as well as other mix ratios, depending on the desired nano-texture.

Next, substrate 505 without the application of a primer layer is cleaned using standard low residue soap and distilled water at interface 510. The substrate 505 is then rinsed with acetone in preparation for the coating process at interface 510. In this embodiment, a bare glass was utilized, although the coating can be applied to most substrates.

After the substrate 505 is rinsed in acetone, the epoxy/nano-particle basecoat 515 is rubbed on the substrate at interface 510 using a lint-free nonwoven cotton wipe and allowed to flash off until the coating turns matte in appearance. This flash process can take a minimum of 5 to 10 seconds to occur, but may take longer. It should be noted that the application of the epoxy basecoat 515 onto the substrate's surface at interface 510 can be executed with other processes, such as but not limited to, spray coating, brushing, or spin coating. After the epoxy basecoat 515 becomes matte, the film is then rubbed with a second dry lint-free nonwoven cotton wipe to thin out the epoxy basecoat 515 and render it transparent. This process generally occurs within 10 minutes of the rub-coating becoming matte, but other waiting periods can be utilized. In addition, other processes can be used to thin the epoxy basecoat 515 other than the use of second dry lint-free nonwoven cotton wipes.

The substrate 505 coated with the epoxy basecoat 515 is then baked at a temperature of 100° C. in air for 30 minutes to allow the epoxy to cure and set. The nano-texture epoxy basecoat 515 curing temperature can vary depending on the amount of time and temperature applied. Curing temperatures can vary between 75° C. and 125° C., with lower temperatures taking more time. Depending on the desired nano-texture, the epoxy basecoat 515 can be applied in one or multiple layers.

Once the substrate 505 with the epoxy basecoat 515 is dry, the self-assembling monolayer 525 is applied to the substrate at 520 (interface) providing the coatings hydrophobic properties. The coated substrate 505 is submerged the completely in a solution consisting of n-decane containing 0.4% 1H,1H,2H,2H-perfluorooctyltrichlorosilane (FOTS) by volume. For optimization, this process should occur in an inert, dry environment and be allowed to develop for 30 minutes. The submersion, or an alternative wetting process for substrates that cannot be submerged, allows the self-assembling monolayer 525 to develop.

The coated substrate 505 is then removed from the n-decane solution and rinsed with n-decane, followed by a rinse with chloroform, followed by rinse with methanol or similar chemical rinses. Rinse solvents are used in increasing polarity to clean off unreacted FOTS. Rinsing is done using a solvent squirt bottle, submersion, or similar cleaning process.

The rinsed coated substrate 505 with the epoxy basecoat 515 and self-assembling monolayer 525 is then placed in an oven to bake in air at a temperature of 100° C. for 30 minutes. The baking process allows the hydrophobic FOTS layer 525 to align. The oven temperature can vary, with lower temperatures taking more time for the hydrophobic FOTS to align. The recommended baking temperature range should be between 75° C. to 125° C.

This coating process yields surface water droplet contact angles averaging 118° at 530 (interface The hydrophobic coating detailed in this embodiment is less than 2 μm thick. This coating is transparent and has been shown to be useful on optical components or any other applications requiring a clear coating.

Embodiment 2: Transparent Lotus Coating Suitable for Optics with Vacuum Deposition Layer (VAC)

In this embodiment, an additional layer of vacuum deposited material may be applied to the "Transparent Lotus Coating Suitable for Optics" formulation detailed in Embodiment 1. It is noted that the vacuum deposition process further increased the durability and hydrophobic properties of the self-assembled monolayer with the addition of addition of self-assembled monolayer unexpectedly improved the adhesion of the vacuum deposition layer to the coating. The adhesion of the vacuum deposition layer to the coating in Embodiment 1 also increased.

First, a nano-textured epoxy basecoat 615 (epoxy basecoat) is created by mixing 0.1 g of silica nanoparticles with an 8:1 ratio of 15 nm particles to 80 nm particles by mass to 4 ml of 4-to-1 TAP epoxy resin, 1 ml of 4-to-1 TAP epoxy hardener, and 40 ml of Optima™ grade acetone. The Optima™ grade acetone is used to dilute the mixture of the epoxy basecoat 615. The epoxy basecoat 615 produces the nano-texture and preferably utilizes several sizes of nano-particles to produce a clumping effect to the texture.

Next, a substrate 605 without the application of a primer layer is cleaned using standard low residue soap and distilled water at interface 610. The substrate 605 is rinsed in acetone in preparation for the coating process at interface 610. In this embodiment, glass was utilized, although the coating can be applied to most substrates.

After the substrate 605 is rinsed in acetone, the epoxy/nano-particle basecoat 615 is rubbed on the substrate at interface 610 using a lint-free nonwoven cotton wipe and allowed to flash off until the coating turns matte in appearance. This flash process can take a minimum of 5 to 10 seconds to occur, but may take longer. It should be noted that the application of the epoxy basecoat 615 onto the substrate's surface at interface 610 can be executed with other processes, such as but not limited to, spray coating, brushing, or spin coating. After the epoxy basecoat 615 becomes matte, the film is then rubbed with a second dry lint-free nonwoven cotton wipe to thin out the epoxy basecoat 615 and render it transparent. This process generally occurs within 10 minutes of the rub-coating becoming matte, but other waiting periods can be utilized. In addition, other processes can be used to thin the epoxy basecoat 615 other than the use of second dry lint-free nonwoven cotton wipes.

Once the substrate 605 coated with the epoxy basecoat 615 is baked at a temperature of 100° C. in air for 30 minutes to allow the epoxy coating to cure and set. The nano-texture epoxy basecoat 615 curing temperature can vary depending on the amount of time and temperature applied. Curing temperatures can vary between 75° C. and 125° C., with lower temperatures taking more time. Depending on the desired nano-texture, the epoxy basecoat 615 can be applied in one or multiple layers.

Once the substrate 605 with the epoxy basecoat 215 is dry, the self-assembling monolayer 625 is applied to the substrate at interface to give it its hydrophobic properties. The coated substrate 605 is submerged completely in a solution consisting of n-decane containing 0.4% 1H,1H,2H,2H-perfluorooctyltrichlorosilane (FOTS) by volume. For optimization, this process should occur in an inert, dry environment and be allowed to develop for 30 minutes. The submersion or alternative wetting process for substrates that cannot be submerged allows the self-assembling monolayer 625 to develop.

Next, the coated substrate 605 is then removed from the n-decane solution and rinsed with n-decane, followed by a rinse with chloroform, followed by a rinse with methanol or similar chemical rinses. Rinse solvents are used in increasing polarity to clean off unreacted FOTS. Rinsing is done using a solvent squirt bottle, submersion, or similar cleaning process.

The rinsed coated substrate 605 with the epoxy basecoat 615 and self-assembling monolayer 625 is then placed in an oven to bake in air at a temperature of 100° C. for 30 minutes. The baking process allows the hydrophobic FOTS layer 625 to align. The oven temperature can vary with lower temperatures taking more time for the hydrophobic FOTS to align. The recommended baking temperature range should be between 75° C. to 125° C.

After the baking process, to further optimize the durability, contact angle, and super-hydrophobic effects of the FOTS self-assembling monolayer 625 at interface 630, the coated substrate 605 with epoxy basecoat 615 and self-assembling monolayer 625 is placed in a vacuum deposition chamber. The top surface of the FOTS at interface 630 of the coated substrate 605 with epoxy basecoat 615 and self-assembling monolayer 625 is, additionally, coated with 100 nm of fluorinated ethylene propylene 9494X using a vacuum deposition process. The deposition occurs in a vacuum with a pressure of $10^{-5}$ Torr and at a deposition rate of 19 μg/cm$^2$ at interface 630. Other thicknesses of fluorinated ethylene propylene or similar material can be applied at alternative deposition rates to enhance the hydrophobic properties.

This variation of the embodiment produced water droplet contact angles averaging 140° at interface 640. With the addition of the fluorinated ethylene propylene 635, the hydrophobic coating detailed in this embodiment is less than 2 μm thick, transparent, and particularly useful on optical components or any other applications requiring a clear coating.

Embodiment 3: Alternative Transparent Lotus Coating Suitable for Optics

Figure 7:
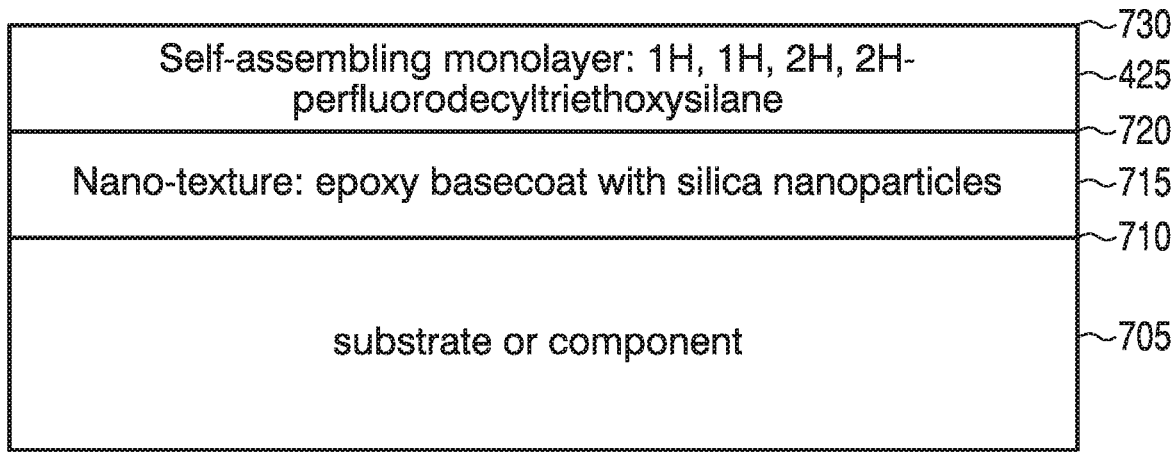
FIG. 7 is an illustration of an embodiment of a alternative transparent lotus coating where the reference numerals 715 and 725 depict the coating layers, and the reference numerals 710 and 720 depict the interfaces between the coating layers and reference numeral 730 depicts the exterior surface of the coating.

This embodiment of the Lotus Coating does not require a primer layer FIG. 7. The epoxy basecoat produces the nano-texture and preferably utilizes several sizes of nano-particles to produce a clumping effect to the texture per FIG. 3. A self-assembling monolayer is then applied to make the coating hydrophobic (water droplet contact angles greater than 90 degrees) or super hydrophobic (water droplet contact angles greater than 150 degrees).

Step one entails the creation of a nano-texture epoxy basecoat 715 (epoxy basecoat) by mixing 0.66 g of silica nanoparticles with an 8:1 ratio of 15 nm particles to 80 nm particles by mass to 0.4 ml of 4-to-1 TAP epoxy resin, 0.1 ml of 4-to-1 TAP epoxy hardener, and 50 ml of Optima™ grade acetone. The Optima™ grade acetone is used to dilute the mixture of the epoxy basecoat 715. The epoxy basecoat 715 produces the nano-texture and preferably utilizes several sizes of nano-particles to produce a clumping effect to the texture.

Step two, a glass bare substrate 705 without the application of a primer layer is cleaned using standard low residue soap and distilled water at 710 (interface). Next, the substrate is rinsed in acetone in preparation for the coating process at 710 (interface). In this embodiment, glass was the desired substrate.

Step three, lint-free nonwoven cotton wipes are used to rub the epoxy basecoat 715, from step one, unto the surface of the substrate at 710 (interface), from step two. The application of the epoxy basecoat 715 unto the substrate 705 at 710 (interface) induces the epoxy basecoat 715 to flash off and turn matte in appearance. This rubbing process takes a minimum of 5 to 10 seconds to occur, but it may take longer. It should be noted that the application of the epoxy basecoat 715 unto the substrate's surface at 710 (interface) can be executed with other processes, such as spray coating, brushing, or spin coating. Next, once the epoxy basecoat 715 becomes matte, a second set of dry lint-free nonwoven cotton wipes are used to thin out and render transparent the epoxy basecoat 715. The thinning out process should occur within 10 minutes of the epoxy basecoat 715 becoming matte; however, other application periods can be utilized. In addition, other processes can be used to thin the epoxy basecoat 715 other than the use of second dry lint-free nonwoven cotton wipes.

Step four, the substrate 705 coated with the epoxy basecoat 715 from step three is baked at a temperature of 100° C. for 30 minutes to allow the coating to cure and set. The nano-texture epoxy basecoat 715 curing temperature can vary depending on the amount of time and temperature applied. Curing temperatures can vary between 75° C. and 125° C. depending on the cure time used. Depending on the desired nano-texture, the epoxy basecoat 715 can be applied in one or multiple layers.

Step five, once the substrate 705 with the epoxy basecoat 715 is dry, the self-assembling monolayer 725 is applied to the substrate at 720 (interface) to give it its hydrophobic properties. For optimization purposes, in an inert and dry environment, submerge completely the substrate 705 with the epoxy basecoat 715 in a self-assembling monolayer 725 solution consisting of 200-proof ethanol containing 0.4% 1H, 1H,2H,2H-perfluorodecyltriethoxysilane (tri-ethoxy) by volute for 16 hours as such is necessary to develop a sufficient monolayer and additional time found to not produce better results. The submersion or an alternative wetting process for substrates that cannot be submerged allows the self-assembling monolayer 725 to develop.

Step six, the coated substrate 705 with the epoxy basecoat 715 is removed from the self-assembling monolayer 725 solution, and it is rinsed with 200-proof ethanol at 730 (interface). Next, it is then blown dry with clean dry air.

Step seven, the rinsed coated substrate 705 with the epoxy basecoat 715 and self-assembling monolayer 725 is then placed in an oven to bake in air at a temperature of 100° C. for 30 minutes. The baking process allows the hydrophobic tri-ethoxy layer to align. The recommended baking temperature range should be between 75° C. to 125° C.

This coating process yields surface water droplet contact angles averaging 120° at 730 (interface). The hydrophobic coating 715 & 725 detailed in this embodiment is less than 2 µm thick, transparent, and particularly useful on optical components or any other applications requiring a clear coating.

Figure 8:
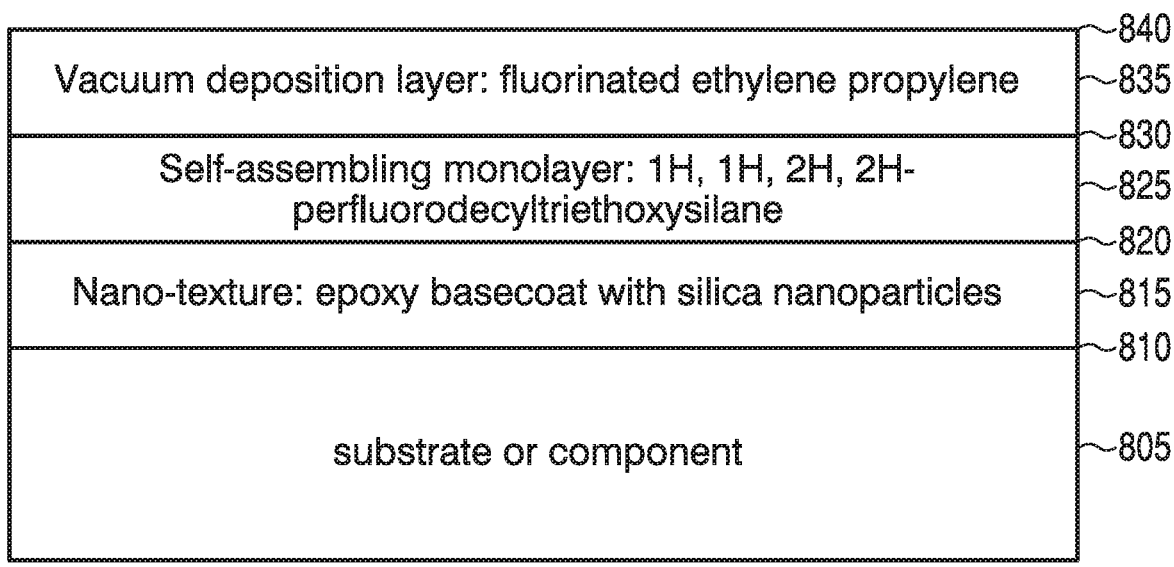
FIG. 8 is an illustration of an embodiment of an alternative transparent lotus coating with a vacuum deposition layer where the reference numerals 815, 825, and 835 depict the coating layers, and the reference numerals 810, 820, and 830 depict the interfaces between the coating layers (410-430) and reference numeral 840 depicts the exterior surface of the coating.

Alternative Transparent Lotus Coating Suitable for Optics with Vacuum Deposition Layer In this embodiment, an additional layer of vacuum deposited material is applied to the "Alternative Transparent Lotus Coating Suitable for Optics" formulation detailed in the previous embodiment per FIG. 8. It is noted that the: addition of self-assembled monolayer unexpectedly improved the adhesion of the vacuum deposition layer to the coating. This coating further optimizes the durability and hydrophobic effects of the "alternative transparent Lotus Coating Suitable for Optics" with the addition fluorinated ethylene propylene.

Step one, a nano-texture epoxy basecoat 815 (epoxy basecoat) is created by mixing 0.66 g of silica nanoparticles with an 8:1 ratio of 15 nm particles to 80 nm particles by mass, to 0.4 ml of 4-to-1 TAP epoxy resin, 0.1 ml of 4-to-1 TAP epoxy hardener, and 50 ml of Optima™ grade acetone. The Optima™ grade acetone is used to dilute the mixture of the epoxy basecoat 815. The epoxy basecoat 815 produces the nano-texture and preferably utilizes several sizes of nano-particles to produce a clumping effect to the texture.

Step two, a glass bare substrate 805 without the application of a primer layer is cleaned using standard low residue soap and distilled water at 810 (interface). Next, the substrate 805 is rinsed in acetone in preparation for the coating process at 810 (interface). In this embodiment, glass was the desired substrate.

Step three, lint-free nonwoven cotton wipes are used to rub the epoxy basecoat 815, from step one, unto the surface of the substrate at 810 (interface), from step two. The application of the epoxy basecoat 815 unto the substrate 805 at 810 (interface) induces the epoxy basecoat 815 to flash off and turn matte in appearance. This rubbing process takes a minimum of 5 to 10 seconds to occur, but it may take longer. It should be noted that the application of the epoxy basecoat 815 unto the substrate's surface at 810 (interface) can be executed with other processes, such as spray coating, brushing, or spin coating. Next, once the epoxy basecoat 815 becomes matte, a second set of dry lint-free nonwoven cotton wipes are used to thin out and render transparent the epoxy basecoat 815. The thinning out process should occur within 10 minutes of the epoxy basecoat 815 becoming matte; however, other application periods can be utilized. In addition, other processes can be used to thin the epoxy basecoat 815 other than the use of second dry lint-free nonwoven cotton wipes.

Step four, the substrate 805 coated with the epoxy basecoat 815 from step three is baked at a temperature of 100° C. for 30 minutes to allow the coating to cure and set. The nano-texture epoxy basecoat 815 curing temperature can vary depending on the amount of time and temperature applied. Curing temperatures can vary between 75° C. and 125° C. depending on the cure time used. Depending on the desired nano-texture, the epoxy basecoat 815 can be applied in one or multiple layers.

Step five, once the substrate 805 with the epoxy basecoat 815 is dry, the self-assembling monolayer 825 is applied to the substrate at 820 (interface) to give it its hydrophobic properties. For optimization purposes, in an inert and dry environment, submerge completely the substrate 805 with the epoxy basecoat 815 in a self-assembling monolayer solution 825 consisting of 200-proof ethanol containing 0.4% 1H, 1H,2H,2H-perfluorodecyltriethoxysilane (tri-ethoxy) by volute for 16 hours. The submersion or wetting process allows the self-assembling monolayer 825 to develop.

Step six, the coated substrate 805 with the epoxy basecoat 815 is removed from the self-assembling monolayer 825 solution, and it is rinsed with 200-proof ethanol at 820 (interface). Next, it is then blown dry with clean dry air at 820 (interface).

Step seven, the dry coated substrate 805 with the epoxy basecoat 815 and self-assembling monolayer 825 is then placed in an oven to bake in air at a temperature of 100° C. for 30 minutes. The baking process allows the hydrophobic tri-ethoxy layer 825 to align. The oven temperature can vary where lower oven temperature is given more time for the hydrophobic tri-ethoxy to align. The recommended baking temperature range should be between 75° C. to 125° C.

Step eight, after the baking process, to further optimize the durability, contact angle, and hydrophobic effects of the tri-ethoxy self-assembling monolayer 825 at 830 (interface), the coated substrate 805 with epoxy basecoat 815 is placed in a vacuum deposition chamber. The top of the tri-ethoxy at 830 (interface) of the coated substrate 805 with epoxy basecoat 815 and self-assembling monolayer 825 is, additionally, coated using vacuum deposition with 100 nm of fluorinated ethylene propylene 9494X 835 under $10^{-5}$ Torr at a deposition rate of 19 µg/cm$^2$ at 830 (interface).

Figure 9:
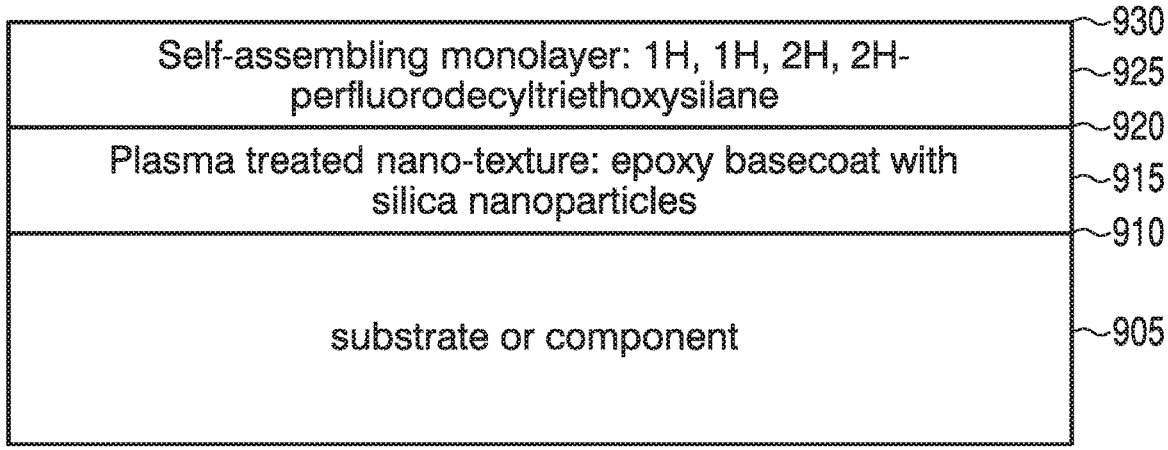
FIG. 9 is an illustration of an embodiment of a transparent plasma treated lotus coating where the reference numerals 915 and 925 depict the coating layers, and the reference numerals 910 and 920 depict the interfaces between the coating layers and reference numeral 930 depicts the exterior surface of the coating.

This embodiment produced water droplet contact angles averaging 144° at 840 (interface). With the addition of the fluorinated ethylene propylene 835, the hydrophobic coating 815, 825, and 835 detailed in this embodiment is less than 2 µm thick, transparent, and particularly useful on optical components or any other applications requiring a clear coating Plasma Treated Alternative Transparent Lotus Coating Suitable for Optics This embodiment of the Lotus Coating does not require a primer layer FIG. 9. The epoxy basecoat produces the nano-texture and preferably utilizes several sizes of nano-particles to produce a clumping effect to the texture per FIG. 3. A self-assembling monolayer is then applied to make the coating hydrophobic (water droplet contact angles greater than 90 degrees) or super hydrophobic (water droplet contact angles greater than 150 degrees).

Step one entails the creation of a nano-texture epoxy basecoat 915 (epoxy basecoat) by mixing 0.66 g of silica nanoparticles with an 8:1 ratio of 15 nm particles to 80 nm particles by mass to 0.4 ml of 4-to-1 TAP epoxy resin, 0.1 ml of 4-to-1 TAP epoxy hardener, and 50 ml of Optima™ grade acetone. The Optima™ grade acetone is used to dilute the mixture of the epoxy basecoat 915. The epoxy basecoat 915 produces the nano-texture and preferably utilizes several sizes of nano-particles to produce a clumping effect to the texture.

Step two, a glass bare substrate 905 without the application of a primer layer is cleaned using standard low residue soap and distilled water at 910 (interface). Next, the substrate is rinsed in acetone in preparation for the coating process at 910 (interface). In this embodiment, glass was the desired substrate.

Step three, lint-free nonwoven cotton wipes are used to rub the epoxy basecoat 915, from step one, unto the surface of the substrate at 910 (interface), from step two. The application of the epoxy basecoat 915 unto the substrate 905 at 910 (interface) induces the epoxy basecoat 915 to flash off and turn matte in appearance. This rubbing process takes a minimum of 5 to 10 seconds to occur, but it may take longer. It should be noted that the application of the epoxy basecoat 915 unto the substrate's surface at 910 (interface) can be executed with other processes, such as spray coating, brushing, or spin coating. Next, once the epoxy basecoat 915 becomes matte, a second set of dry lint-free nonwoven cotton wipes are used to thin out and render transparent the epoxy basecoat 915. The thinning out process should occur within 10 minutes of the epoxy basecoat 915 becoming matte; however, other application periods can be utilized. In addition, other processes can be used to thin the epoxy basecoat 915 other than the use of second dry lint-free nonwoven cotton wipes.

Step four, the substrate 905 coated with the epoxy basecoat 915 from step three is baked at a temperature of 100° C. for 30 minutes to allow the coating to cure and set. The nano-texture epoxy basecoat 915 curing temperature can vary depending on the amount of time and temperature applied. Curing temperatures can vary between 75° C. and 125° C. depending on the cure time used. Depending on the desired nano-texture, the epoxy basecoat 915 can be applied in one or multiple layers.

Step five, once the substrate 905 with the epoxy basecoat 915 is dry, it is placed in a plasma chamber with a pressure lower than $2.5 \times 10^{-3}$ Torr. The substrate 905 with the epoxy basecoat 915 at 920 (interface) is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances the epoxy basecoat 915 properties and texture by exposing and cleaning the silica nano-particles prior at 920 (interface) prior to the application of the self-assembling monolayer 925.

Step six, after oxygen plasma treatment at 920 (interface), the self-assembling monolayer 925 is applied to the plasma treated nano-textured layer at 920 (interface) providing its hydrophobic properties. For optimization purposes, in an inert and dry environment, submerge completely the substrate 905 with the epoxy basecoat 915 in a self-assembling monolayer 925 solution consisting of 200-proof ethanol containing 0.4% 1H,1H,2H,2H-perfluorodecyltriethoxysilane (tri-ethoxy) by volute for 16 hours. The submersion or wetting process allows the self-assembling monolayer 925 to develop.

Step seven, the coated substrate 905 with the epoxy basecoat 915 is removed from the self-assembling monolayer 925 solution, and it is rinsed with 200-proof ethanol at 930 (interface). Next, it is then blown dry with clean dry air.

Step eight, the dry coated substrate 905 with the epoxy basecoat 915 and self-assembling monolayer 925 is then placed in an oven to bake in air at a temperature of 100° C. for 30 minutes. The baking process allows the hydrophobic tri-ethoxy layer to align. The recommended baking temperature range is between 75° C. to 125° C.

This coating process yields surface water droplet contact angles averaging 1300 at 930 (interface). The hydrophobic coating 915 & 925 detailed in this embodiment is less than 2 μm thick, transparent, and particularly useful on optical components or any other applications requiring a clear coating.

Figure 10:
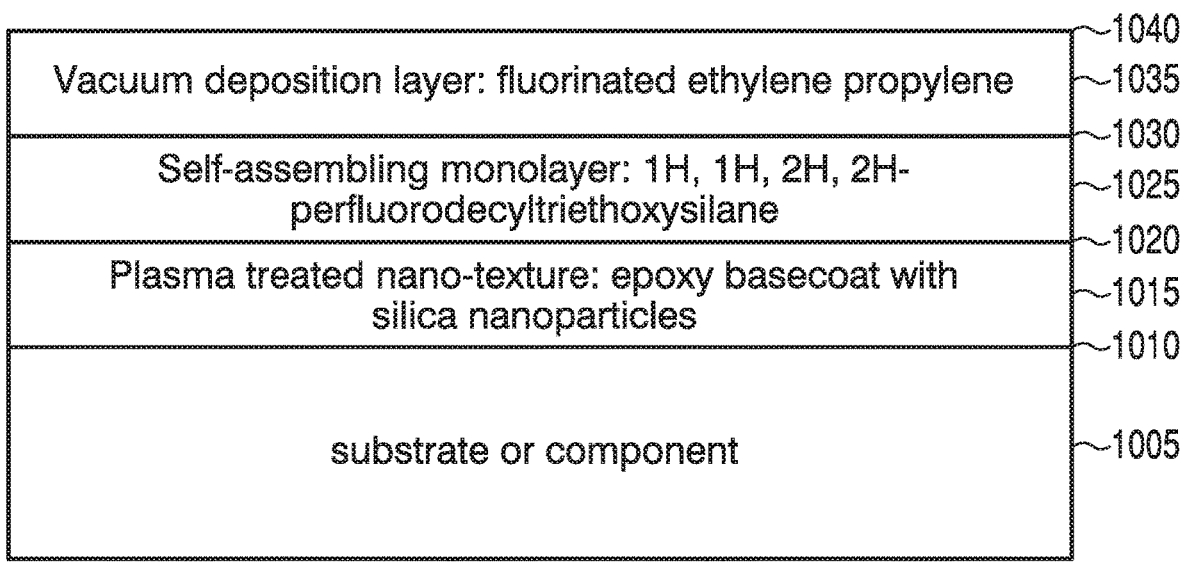
FIG. 10 is an illustration of an embodiment of a transparent plasma treated lotus coating with a vacuum deposition layer where the reference numerals 1015, 1025, and 1035 depict the coating layers, and the reference numerals 1010, 1020, and 1030 depict the interfaces between the coating layers and reference numeral 1040 depicts the exterior surface of the coating.

Plasma Treated Alternative Transparent Lotus Coating Suitable for Optics with Vacuum Deposition Layer In this embodiment, an additional layer of vacuum deposited material may be applied to the "Plasma Treated Alternative Transparent Lotus Coating Suitable for Optics" formulation detailed in the previous embodiment, depending on desired coating properties, durability, desired contact angle, and final application FIG. 10.

Step one entails the creation of a nano-texture epoxy basecoat 915 (epoxy basecoat) by mixing 0.66 g of silica nanoparticles with an 8:1 ratio of 15 nm particles to 80 nm particles by mass to 0.4 ml of 4-to-1 TAP epoxy resin, 0.1 ml of 4-to-1 TAP epoxy hardener, and 50 ml of Optima™ grade acetone. The Optima™ grade acetone is used to dilute the mixture of the epoxy basecoat 915. The epoxy basecoat 915 produces the nano-texture and preferably utilizes several sizes of nano-particles to produce a clumping effect to the texture.

Step three, lint-free nonwoven cotton wipes are used to rub the epoxy basecoat 1015, from step one, unto the surface of the substrate at 1010 (interface), from step two. The application of the epoxy basecoat 1015 unto the substrate 1005 at 1010 (interface) induces the epoxy basecoat 1015 to flash off and turn matte in appearance. This rubbing process takes a minimum of 5 to 10 seconds to occur, but it may take longer. It should be noted that the application of the epoxy basecoat 1015 unto the substrate's surface at 1010 (interface) can be executed with other processes, such as spray coating, brushing, or spin coating. Next, once the epoxy basecoat 1015 becomes matte, a second set of dry lint-free nonwoven cotton wipes are used to thin out and render transparent the epoxy basecoat 1015. The thinning out process should occur within 10 minutes of the epoxy basecoat 1015 becoming matte. In addition, other processes can be used to thin the epoxy basecoat 1015 other than the use of second dry lint-free nonwoven cotton wipes.

Step four, the substrate 1005 coated with the epoxy basecoat 1015 from step three is baked at a temperature of 100° C. for 30 minutes to allow the coating to cure and set. The nano-texture epoxy basecoat 1015 curing temperature can vary depending on the amount of time and temperature applied. Curing temperatures can vary between 75° C. and 125° C. depending on the cure time used. Depending on the desired nano-texture, the epoxy basecoat 1015 can be applied in one or multiple layers.

Step five, once the substrate 1005 with the epoxy basecoat 1015 is dry, it is placed in a plasma chamber with a pressure lower than $2.5 \times 10^{-3}$ Torr. The substrate 1005 with the epoxy basecoat 1015 at 1020 (interface) is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances the epoxy basecoat 1015 properties and texture by exposing and cleaning the silica nano-particles prior to the application of the self-assembling monolayer 1025.

Step six, after oxygen plasma treatment at 1020 (interface), the self-assembling monolayer 1025 is applied to the substrate at 1020 (interface) to give it its super-hydrophobic properties. For optimization purposes, in an inert and dry environment, submerge completely the substrate 1005 with the epoxy basecoat 1015 in a self-assembling monolayer 1025 solution consisting of 200-proof ethanol containing 0.4% 1H, 1H,2H,2H-perfluorodecyltriethoxysilane (tri-ethoxy) by volute for 16 hours. The submersion or wetting process allows the self-assembling monolayer to develop.

Step seven, the coated substrate 1005 with the epoxy basecoat 1015 is removed from the self-assembling monolayer 1025 solution, and it is rinsed with 200-proof ethanol at 1030 (interface). Next, it is then blown dry with clean dry air.

Step eight, the dry coated substrate 1005 with the epoxy basecoat 1015 and self-assembling monolayer 1025 is then placed in an oven to bake in air at a temperature of 100° C. for 30 minutes. The baking process allows the super-hydrophobic tri-ethoxy layer to align. The recommended baking temperature range should be between 75° C. to 125° C.

Step nine, after the baking process, to further optimize the durability, contact angle, and super-hydrophobic effects of the tri-ethoxy self-assembling monolayer 1025 at 1030 (interface), the coated substrate 1005 with epoxy basecoat 1015 is placed in a vacuum deposition chamber. The top of the tri-ethoxy at 1030 (interface) of the coated substrate 1005 with epoxy basecoat 1015 is, additionally, coated with 100 nm of fluorinated ethylene propylene 9494X 1035 under $10^{-5}$ Torr at a deposition rate of 19 μg/cm² at 1030 (interface).

Figure 11:
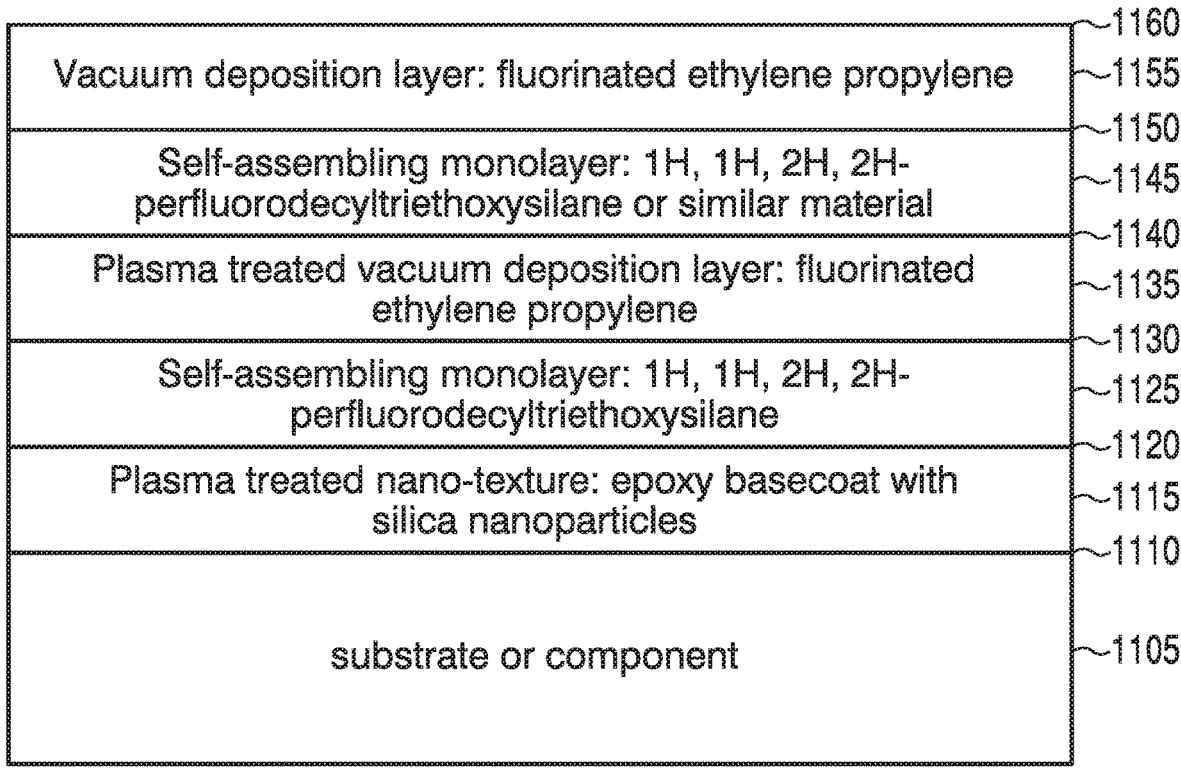
FIG. 11 is an illustration of an embodiment of a transparent double plasma treated lotus coating where the reference numerals 1115, 1125, 1135, 1145, and 1155 depict the coating layers, and the reference numerals 1110, 1120, 1130, 1140, and 1150 depict the interfaces between the coating layers and reference numeral 1160 depicts the exterior surface of the coating.

This coating process yields surface water droplet contact angles averaging 1610 at 1040 (interface). With the addition of the fluorinated ethylene propylene 1035, the hydrophobic coating 1015, 1025, and 1035 detailed in this embodiment is less than 2 μm thick, transparent, and particularly useful on optical components or any other applications requiring a clear coating Double Plasma Treated Alternative Transparent Lotus Coating Suitable for Optics This embodiment of the Lotus Coating does not require a primer layer FIG. 11. The epoxy basecoat produces the nano-texture and preferably utilizes several sizes of nano-particles to produce a clumping effect to the texture per FIG. 3. A self-assembling mono-layer is then applied to make the coating hydrophobic (water droplet contact angles greater than 90 degrees) or super hydrophobic (water droplet contact angles greater than 150 degrees).

Step one entails the creation of a nano-texture epoxy basecoat 1115 (epoxy basecoat) by mixing 0.66 g of silica nanoparticles with an 8:1 ratio of 15 nm particles to 80 nm particles by mass to 0.4 ml of 4-to-1 TAP epoxy resin, 0.1 ml of 4-to-1 TAP epoxy hardener, and 50 ml of Optima™ grade acetone. The Optima™ grade acetone is used to dilute the mixture of the epoxy basecoat 1115. The epoxy basecoat 1115 produces the nano-texture and preferably utilizes several sizes of nano-particles to produce a clumping effect to the texture.

Step two, a glass bare substrate 1105 without the application of a primer layer is cleaned using standard low residue soap and distilled water at 1110 (interface). Next, the substrate is rinsed in acetone in preparation for the coating process at 1110 (interface). In this embodiment, glass was the desired substrate; however, other substrate materials could be used.

Step three, lint-free nonwoven cotton wipes are used to rub the epoxy basecoat 1115, from step one, unto the surface of the substrate at 1110 (interface), from step two. The application of the epoxy basecoat 1115 unto the substrate 1105 at 1110 (interface) induces the epoxy basecoat 1115 to flash off and turn matte in appearance. This rubbing process takes a minimum of 5 to 10 seconds to occur, but it may take longer. It should be noted that the application of the epoxy basecoat 1115 unto the substrate's surface at 1110 (interface) can be executed with other processes, such as spray coating, brushing, or spin coating. Next, once the epoxy basecoat 1115 becomes matte, a second set of dry lint-free nonwoven cotton wipes are used to thin out and render transparent the epoxy basecoat 1115. The thinning out process should occur within 10 minutes of the epoxy basecoat 1115 becoming matte. In addition, other processes can be used to thin the epoxy basecoat 1115 other than the use of second dry lint-free nonwoven cotton wipes.

Step four, the substrate 1105 coated with the epoxy basecoat 1115 from step three is baked at a temperature of 100° C. for 30 minutes to allow the coating to cure and set. The nano-texture epoxy basecoat 1115 curing temperature can vary depending on the amount of time and temperature applied. Curing temperatures can vary between 75° C. and 125° C. depending on the cure time used. Depending on the desired nano-texture, the epoxy basecoat 1115 can be applied in one or multiple layers.

Step five, once the substrate 1105 with the epoxy basecoat 1115 is dry, it is placed in a plasma chamber with a pressure lower than $2.5 \times 10^{-3}$ Torr. The substrate 1105 with the epoxy basecoat 1115 at 1120 (interface) is exposed to 10 minutes of oxygen plasma treatment at $3 \times 10^{-3}$ Torr, with 2000 volts, and modulating current under 0.2 Amps. The plasma process is repeated for the time duration. The oxygen plasma treatment enhances the epoxy basecoat 1115 properties and texture by exposing and cleaning the silica nano-particles prior to the application of the self-assembling monolayer 1125.

Step six, after oxygen plasma treatment at 1120 (interface), the self-assembling monolayer 1125 is applied to the substrate at 1120 (interface) to give it its super-hydrophobic properties. For optimization purposes, in an inert and dry environment, submerge completely the substrate 1105 with the epoxy basecoat 1115 in a self-assembling monolayer 1125 solution consisting of 200-proof ethanol containing 0.4% 1H,1H,2H,2H-perfluorodecyltriethoxysilane (tri-ethoxy) by volute for 16 hours. The submersion or wetting process allows the self-assembling monolayer to develop.

Step seven, the coated substrate 1105 with the epoxy basecoat 1115 is removed from the self-assembling monolayer 1125 solution, and it is rinsed with 200-proof ethanol at 1130 (interface). Next, it is then blown dry with clean dry air.

Step eight, the dry coated substrate 1105 with the epoxy basecoat 1115 and self-assembling monolayer 1125 is then placed in an oven to bake in air at a temperature of 100° C. for 30 minutes. The baking process allows the super-hydrophobic tri-ethoxy layer to align. The recommended baking temperature range should be between 75° C. to 125° C.

Step nine, after the baking process, to further optimize the durability, contact angle, and super-hydrophobic effects of the tri-ethoxy self-assembling monolayer 1125 at 1130 (interface), the coated substrate 1105 with epoxy basecoat 1115 is placed in a vacuum deposition chamber. The top of the tri-ethoxy at 1130 (interface) of the coated substrate with epoxy basecoat 1115 is, additionally, coated with 100 nm of fluorinated ethylene propylene 9494X 1135 under $10^{-5}$ Torr at a deposition rate of 19 μg/cm² at 1130 (interface).

Step ten, after the vacuum deposition process, the substrate 1105 with epoxy basecoat 1115, self-assembling monolayer 1125, and fluorinated ethylene propylene 9494X 1135 is placed in a plasma chamber with a pressure lower than $2.5 \times 10^{-3}$ Torr. The fluorinated ethylene propylene 9494X 1135 at 1140 (interface) is exposed to 2 minutes 30 seconds of oxygen plasma treatment at $3 \times 10^{-3}$ Torr, with 2000 volts, and modulating current under 0.2 Amps. The plasma process is repeated for the time duration. The oxygen plasma treatment enhances the fluorinated ethylene propylene 9494X 1135 at 1140 (interface) properties and texture through cleansing and cleaning prior to the application of the self-assembling monolayer 1145.

Step eleven, after oxygen plasma treatment at 1140, an additional self-assembling monolayer 1145 is applied to the top of the fluorinated ethylene propylene 9494X 1135 at 1140 (interface) to further enhance its super-hydrophobic properties. For optimization purposes, in an inert and dry environment, submerge completely the substrate 1105 with the epoxy basecoat 1115, self-assembling monolayer 1125, and fluorinated ethylene propylene 9494X 1135 in a self-assembling monolayer 1145 solution consisting of 200-proof ethanol containing 0.4% 1H,1H,2H,2H-perfluorodecyltriethoxysilane (tri-ethoxy) by volume for 16 hours. The submersion or wetting process allows the self-assembling monolayer to develop.

Step twelve, the coated substrate 1105 with the epoxy basecoat 1115, self-assembling monolayer 1125, and fluorinated ethylene propylene 9494X 1135 is removed from the self-assembling monolayer 1145 solution, and it is rinsed with 200-proof ethanol at 1150 (interface). Next, it is then blown dry with clean dry air.

Step thirteen, the dry coated substrate 1105 with the epoxy basecoat 1115, self-assembling monolayer 1125, fluorinated ethylene propylene 9494X 1135, and self-assembling monolayer 1145 is then placed in an oven to bake in air at a temperature of 100° C. for 30 minutes. The baking process allows the super-hydrophobic tri-ethoxy layer to align. The baking process allows the super-hydrophobic tri-ethoxy layer to align. The recommended baking temperature range should be between 75° C. to 125° C.

Step fourteen, after the baking process, to further optimize the durability, contact angle, and super-hydrophobic effects of the tri-ethoxy self-assembling monolayer 1145 at 1150 (interface), the coated substrate 1105 with the epoxy basecoat 1115, self-assembling monolayer 1125, fluorinated ethylene propylene 9494X 1135, and self-assembling monolayer 1145 is placed in a vacuum deposition chamber. The top of the tri-ethoxy at 1150 (interface) of the coated substrate 1105 with the epoxy basecoat 1115, self-assembling monolayer 1125, fluorinated ethylene propylene 9494X 1135, and self-assembling monolayer 1145 is, additionally, coated with 100 nm of fluorinated ethylene propylene 9494X 1155 under $10^{-5}$ Torr at a deposition rate of 19 µg/cm$^2$ at 1150 (interface).

This coating process yields surface water droplet contact angles averaging 170° at 1160 (interface). With the addition of the fluorinated ethylene propylene 9494X 1155, the super-hydrophobic coating 1115, 1125, 1135, 1145, and 1155 detailed in this embodiment is less than 2 µm thick, transparent, and particularly useful on optical components or any other applications requiring a clear coating.

Durable Opaque Lotus Coating

Figure 12:
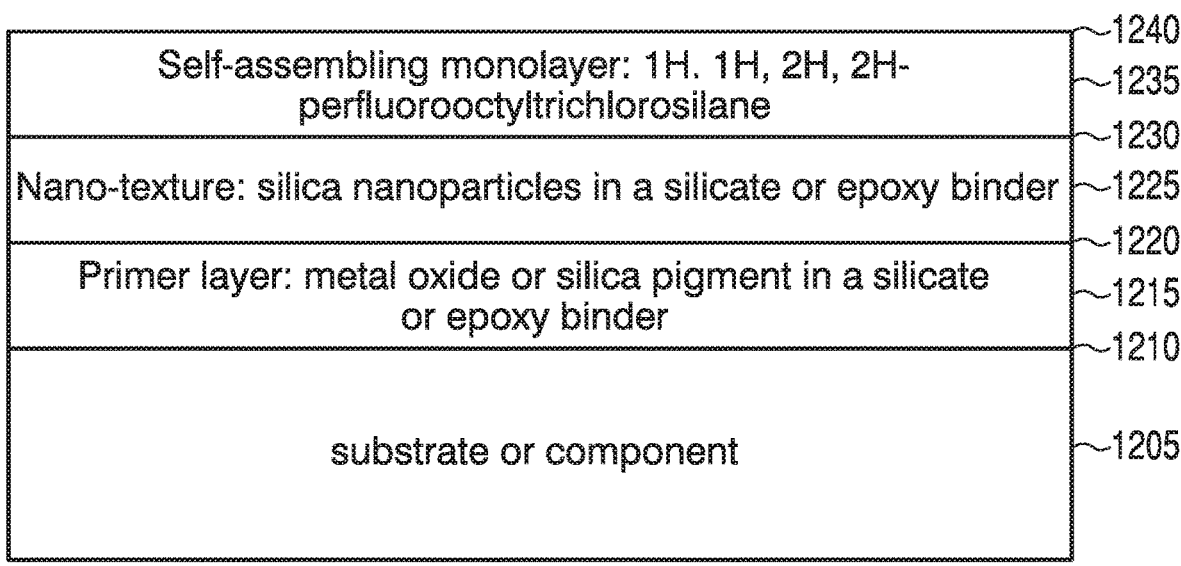
FIG. 12 is an illustration of an embodiment of a durable opaque lotus coating where the reference numerals 1215, 1225, and 1235 depict the coating layers, and the reference numerals 1210, 1220, and 1230 depict the interfaces between the coating layers and reference numeral 1240 depicts the exterior surface of the coating.

This embodiment of the Lotus Coating utilizes primer layer for increased adhesion to a variety of substrates FIG. 12. The primer provides the opaque characteristics of the coating. The silicate basecoat produces the nano-texture and preferably utilizes several sizes of nano-particles to produce a clumping effect to the texture per FIG. 3. A self-assembling mono-layer is then applied to the silicate basecoat to make the coating hydrophobic (water droplet contact angles greater than 90 degrees) or super hydrophobic (water droplet contact angles greater than 150 degrees). Specimens of this embodiment were flown into space for experimental testing a specified time, and proved to withstand the harsh space environment with minimal degradation of its super-hydrophobic properties.

Step one entails the creation of an opaque nano-texture basecoat 1215 (silicate basecoat) by mixing 1.125 g of silica nanoparticles with an 8:1 ratio of 15 nm particles to 80 nm particles by mass to 1.7 g of LiNa-33 Silicate Binder, which is then diluted with 32 ml of distilled water. The silicate basecoat 1215 produces the nano-texture and preferably utilizes several sizes of nano-particles to produce a clumping effect to the texture.

Step two, a glass bare substrate 1205 without the application of a primer layer is cleaned using standard low residue soap and distilled water at 1210 (interface). Next, the substrate is rinsed in acetone in preparation of the application of a primer layer 1215 at 1210 (interface). In this embodiment, glass was the desired substrate.

Step three, after the substrate 1205 is cleaned, a primer layer 1215 that preferably includes metal oxide, silica pigment in silicate, or epoxy binder is applied to the substrate 1205 at 1210 (interface). The primer 1215 used in this embodiment is AZ Tech MLP-300™ Primer. The primer layer 1215 is spray coated, brushed, or spin coated on the surface at 1210 (interface) of the substrate 1205.

Step four, the substrate 1205 with the primer layer 1215 is dried in air for approximately 20 minutes. Although it is preferred that for MLP primer, a 48 hour bake at 212 F, facilitates a full cured of the primer before advancing in this process.

Step five, the substrate 1205 with the dried primer layer 1215 is preferably sprayed with a fog coat of silicate basecoat 1225 at 1220 (interface). It should be noted that the application of the silicate basecoat 1225 unto the substrate 1205 with the primer layer's 1215 surface at 1220 (interface) can be executed with other processes, such as rub priming, brushing, or spin coating.

Step six, the silicate basecoat 1225 applied to the substrate 1205 with the primer layer 1215 is allowed to dry for preferably 24 hours but no less than 12 hours in air at room temperature.

Step seven, once the substrate 1205 with the primer 1215 and silicate basecoat 1225 is dry, the self-assembling monolayer 1235 is applied to the substrate at 1230 (interface) to give it its super-hydrophobic properties. For optimization purposes, in an inert and dry environment, submerge completely the substrate 1205 with primer and silicate basecoat 1225 in a self-assembling monolayer 1235 solution consisting of n-decane containing 0.4% 1H,1H,2H,2H-perfluorooctyltrichlorosilane (FOTS) by volume for 30 minutes which has been demonstrated to be sufficient formation of monolayer with additional time yielding no additional benefits. The submersion or wetting process allows the self-assembling monolayer 1235 to develop.

Step eight, the coated substrate 1205 with primer 1215 and silicate basecoat 1225 is removed from the self-assembling monolayer 1235 solution, and it is rinsed in the coming sequence of solutions at 1240 (interface). The first solution used for rinsing the coated substrate 1205 with primer 1215, silicate basecoat 1225, and self-assembling monolayer 1235 is n-decane; the second solution used for rinsing is chloroform, and the last solution is methanol.

Step nine, the rinsed coated substrate 1205 with primer 1215, silicate basecoat 1225, and self-assembling monolayer 1235 is then placed in an oven to bake in air at a temperature of 100° C. for 30 minutes. The baking process allows the super-hydrophobic FOTS layer 1235 to align. The recommended baking temperature range should be between 75° C. to 125° C.

This coating process yields surface water droplet contact angles averaging 163° at 1240 (interface). The super-hydrophobic coating 1215, 1225, and 1235 detailed in this embodiment is less than 2 µm thick, translucent or opaque, and particularly useful on optical components or any other applications not requiring an optically clear coating.

Durable Opaque Lotus Coating with Vacuum Deposition Layer

Figure 13:
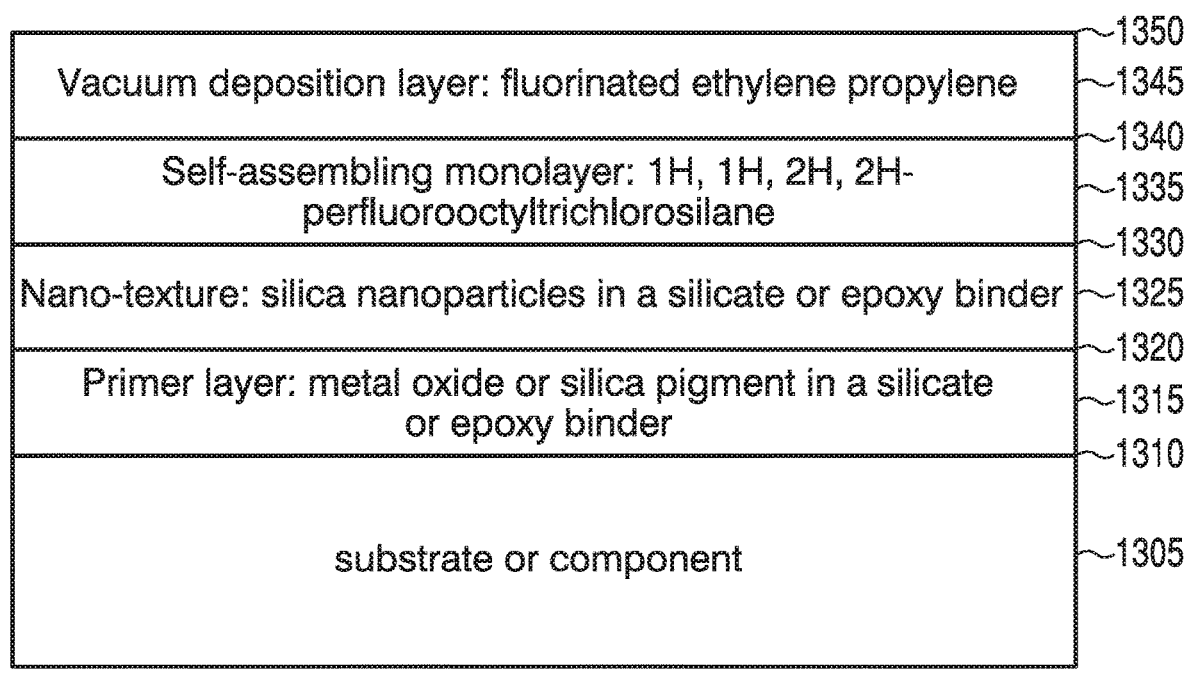
FIG. 13 is an illustration of an embodiment of a durable opaque lotus coating with a vacuum deposition layer where the reference numerals 1315, 1325, 1335, and 1345 depict the coating layers, and the reference numerals 1310, 1320, 1330, and 1340 depict the interfaces between the coating layers and reference numeral 1350 depicts the exterior surface of the coating.

In this embodiment, an additional layer of vacuum deposited material may be applied to the "Durable Opaque Lotus Coating" formulation detailed in the previous embodiment, depending on desired coating properties, durability, desired contact angle, and final application FIG. 13.

Step one entails the creation of an opaque nano-texture basecoat 1315 (silicate basecoat) by adding 1.125 g of silica nanoparticles with an 8:1 ratio of 15 nm particles to 80 nm particles by mass to 1.7 g of LiNa-33 Silicate Binder, which is then diluted with 32 ml of distilled water. The silicate basecoat 1315 produces the nano-texture and preferably utilizes several sizes of nano-particles to produce a clumping effect to the texture.

Step two, a glass bare substrate 1305 without the application of a primer layer is cleaned using standard low residue soap and distilled water at 1310 (interface). Next, the substrate is rinsed in acetone in preparation of the application of a primer layer 1315 at 1310 (interface). In this embodiment, glass was the desired substrate.

Step three, after the substrate 1305 is cleaned, a primer layer 1315 that preferably includes metal oxide, silica pigment in silicate, or epoxy binder is applied to the substrate 1305 at 1310 (interface). The primer 1315 used in this embodiment is AZ Tech MLP-300™ Primer. The primer layer 1315 is spray coated, brushed, or spin coated on the surface at 1310 (interface) of the substrate 1305.

Step four, the substrate 1305 with the primer layer 1315 is preferably dried in air for approximately 20 minutes.

Step five, the substrate 1305 with the dried primer layer 1315 is preferably sprayed with a fog coat of silicate basecoat 1325 at 1320 (interface). It should be noted that the application of the silicate basecoat 1325 unto the substrate 1305 with the primer layer's surface at 1320 (interface) can be executed with other processes, such as rub priming, brushing, or spin coating.

Step six, the silicate basecoat 1325 applied to the substrate 1305 with the primer layer 1315 is allowed to dry for preferably 24 hours but no less than 12 hours in air at room temperature.

Step seven, once the substrate 1305 with the primer 1315 and silicate basecoat 1325 is dry, the self-assembling monolayer 1335 is applied to the substrate at 1330 (interface) to give it its super-hydrophobic properties at 1330 (interface). For optimization purposes, in an inert and dry environment, submerge completely the substrate 1305 with primer 1315 and silicate basecoat 1325 in a self-assembling monolayer 1335 solution consisting of n-decane containing 0.4% 1H,1H,2H,2H-perfluorooctyltrichlorosilane (FOTS) by volume for 30 minutes. The submersion or wetting process allows the self-assembling monolayer 1335 to develop.

Step eight, the coated substrate 1305 with primer 1315, silicate basecoat 1325 is removed from the self-assembling monolayer 1335 solution, and it is rinsed in the coming sequence of solutions at 1340 (interface). The first solution used for rinsing the coated substrate 1305 with primer 1315, silicate basecoat 1325, and self-assembling monolayer 1335 is n-decane; the second solution used for rinsing is chloroform, and the last solution is methanol.

Step nine, the rinsed coated substrate 1305 with primer 1315, silicate basecoat 1325, and self-assembling monolayer 1335 is then placed in an oven to bake in air at a temperature of 100° C. for 30 minutes. The baking process allows the super-hydrophobic FOTS layer 1335 to align. The recommended baking temperature range should be between 75° C. to 125° C.

Step ten, after the baking process, to further optimize the durability, contact angle, and super-hydrophobic effects of the FOTS self-assembling monolayer 1335 at 1340 (interface), the coated substrate 1305 with primer 1315, silicate basecoat 1325, and self-assembling monolayer 1335 is placed in a vacuum deposition chamber. The top of the FOTS at 1340 (interface) of the coated substrate 1305 with primer 1315, silicate basecoat 1325, and self-assembling monolayer 1335 is, additionally, coated with 100 nm of fluorinated ethylene propylene 9494X 1345 under $10^{-5}$ Torr at a deposition rate of 19 gig/cm$^2$ at 1350 (interface).

This coating process yields surface water droplet contact angles averaging 1670 at 1350 (interface). The super-hydrophobic coating 1315, 1325, 1335, and 1345 detailed in this embodiment is less than 2 µm thick, translucent or opaque, particularly useful on optical components or any other applications not requiring an optically clear coating.

Patterned Opaque Vacuum Deposition Layer on Lotus Coating

Figure 14:
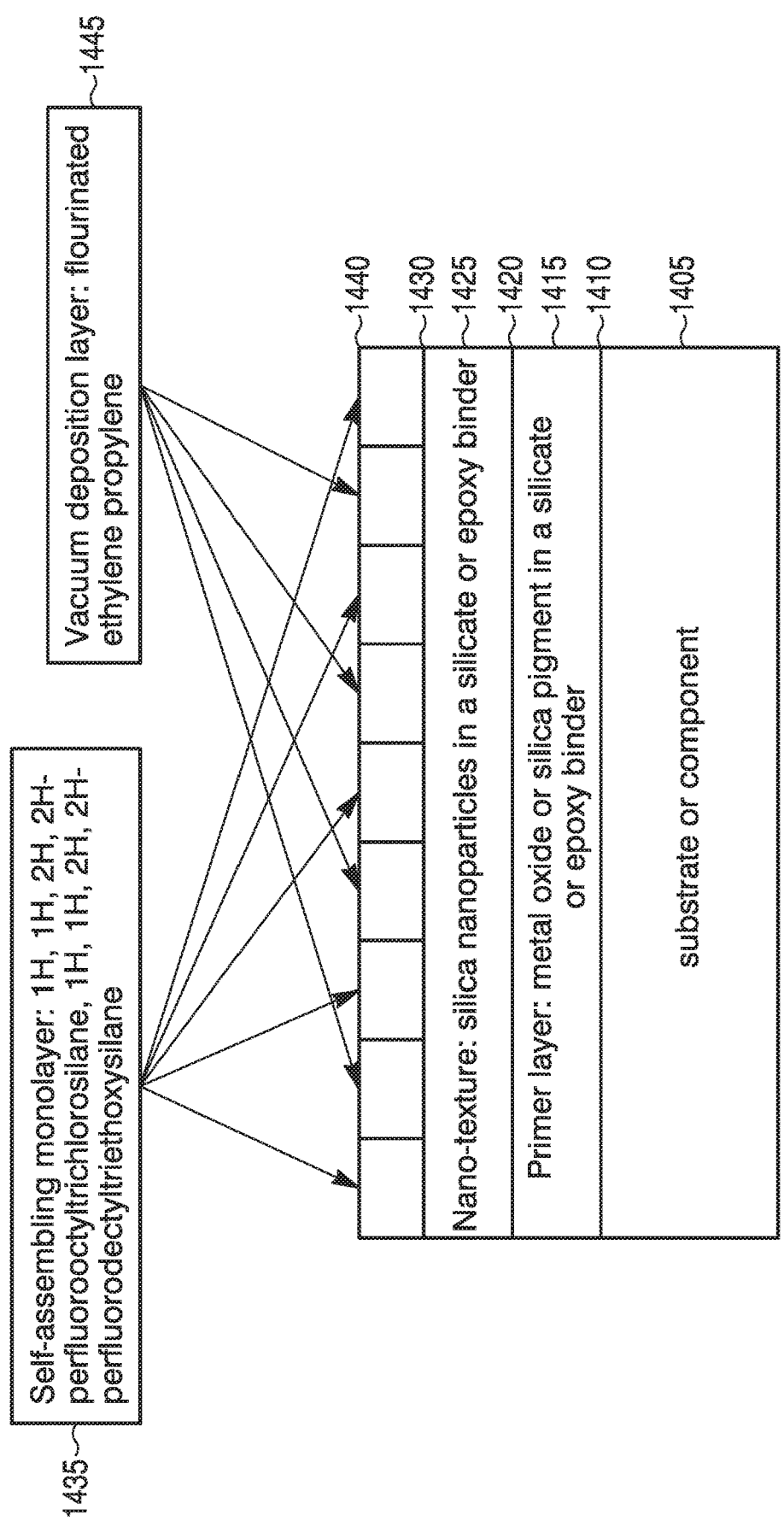
FIG. 14 is an illustration of another embodiment of a louts coating with a patterned vacuum deposition layer where the reference numerals 1415, 1425, 1435, and 1445 depict the coating layers, and the reference numerals 1410, 1420, and 1430 depict the interfaces between the coating layers and reference numeral 1440 depicts the exterior surface of the coating.

This embodiment of the Lotus Coating utilizes primer layer for increased adhesion to a variety of substrates FIG. 14. The primer provides the opaque characteristics of the coating. The silicate basecoat produces the nano-texture and preferably utilizes several sizes of nano-particles to produce a clumping effect to the texture per FIG. 3. A pattern of self-assembling monolayer and fluorinated ethylene propylene is created by using a masking process.

Step one entails the creation of an opaque nano-texture basecoat 1415 (silicate basecoat) by adding 1.125 g of silica nanoparticles with an 8:1 ratio of 15 nm particles to 80 nm particles by mass to 1.7 g of LiNa-33 Silicate Binder, which is then diluted with 32 ml of distilled water. The silicate basecoat 1015 produces the nano-texture and preferably utilizes several sizes of nano-particles to produce a clumping effect to the texture.

Step two, a glass bare substrate 1405 without the application of a primer layer is cleaned using standard low residue soap and distilled water at 1410 (interface). Next, the substrate is rinsed in acetone in preparation of the application of a primer layer 1415 at 1410 (interface). In this embodiment, glass was the desired substrate.

Step three, after the substrate 1405 is cleaned, a primer layer 1415 that preferably includes metal oxide, silica pigment in silicate, or epoxy binder is applied to the substrate 1405 at 1410 (interface). The primer 1415 used in this embodiment is AZ Tech MLP-300 Primer. The primer layer 1415 is spray coated, brushed, or spin coated on the surface at 1410 (interface) of the substrate 1405.

Step four, the substrate 1405 with the primer layer 1415 is preferably dried in air for approximately 20 minutes.

Step five, the substrate 1405 with the dried primer layer 1415 is sprayed with a fog coat of silicate basecoat 1025 at 1420 (interface). It should be noted that the application of the silicate basecoat 1425 unto the substrate 1405 with the primer layer's surface at 1420 (interface) can be executed with other processes, such as rub priming, brushing, or spin coating.

Step six, the silicate basecoat 1425 applied to the substrate 1405 with the primer layer 1415 is allowed to dry for preferably 24 hours but no less than 12 hours in air at room temperature.

Step seven, once the substrate 1405 with the primer 1415 and silicate basecoat 1425 is dry, a mask is placed on the top layer of the silicate basecoat 1425 at 1430 (interface) to create a pattern of FOTS or tri-ethoxy self-assembling monolayer 1435. The mask can be a screen, mesh, or other pattern. The masking process selectively exposes, in a pattern, sections of the top layer at 1430 (interface) of the silicate basecoat 1425.

Step eight, once the mask is placed on the top layer at 1430 (interface) of the silicate basecoat 1425, the self-assembling monolayer 1435 is applied to the exposed section of the top layer at 1430 (interface) of silicate basecoat 1425 providing super-hydrophobic properties at 1440 (interface). For optimization purposes, in an inert and dry environment, submerge completely the substrate 1405 with primer 1415, and masked silicate basecoat 1425 in a self-assembling monolayer 1435 solution consisting of n-decane containing 0.4% 1H, 1H,2H,2H-perfluorooctyltrichlorosilane (FOTS) by volume or tri-ethoxy for 30 minutes. The submersion or wetting process allows the self-assembling monolayer 1435 to develop.

Step nine, the coated substrate 1405 with primer 1415, silicate basecoat 1425 and mask at 1430 (interface) is removed from the self-assembling monolayer 1435 solution, and it is rinsed in the coming sequence of solutions at 1430 (interface) & 1440 (interface). The first solution used for rinsing the coated substrate 1405 with primer 1415, silicate basecoat 1425, self-assembling monolayer 935 solution, and mask located at 1430 (interface) is n-decane; the second solution used for rinsing is chloroform, and the last solution is methanol.

Step ten, the rinsed coated substrate 1405 with primer 1415, silicate basecoat 1425, self-assembling monolayer 1435 solution, and mask located at 1430 (interface) is then placed in an oven to bake in air at a temperature of 100° C. for 30 minutes. The baking process allows the super-hydrophobic FOTS or tri-ethoxy 1435 to align. The recommended baking temperature range should be between 75° C. to 125° C.

Step eleven, after the baking process, the mask on top of the silicate basecoat 1425 at 1430 (interface) is removed where the top layer at 1430 (interface) of the silicate basecoat 1425 has patterns of self-assembling monolayers 1435 at 1440 (interface) (FOTS or tri-ethoxy) versus exposed silicate basecoat 1425 at 1430 (interface). Next, another mask, screen, mesh, or other pattern is placed on top of the self-assembling monolayer 1435 (FOTS or tri-ethoxy) at 1440 (interface) exposing only the silicate basecoat 1425 at 1430 (interface).

Step twelve, after the masking process, to further optimize the durability, contact angle, and super-hydrophobic effects of the FOTS or tri-ethoxy self-assembling monolayer 1435, the coated substrate 1405 with primer 1415, silicate basecoat 1425, self-assembling monolayer 1435 solution, and mask located 1440 (interface) is placed in a vacuum deposition chamber. The top of the exposed silicate basecoat 1425 at 1430 (interface) is coated with 100 nm of fluorinated ethylene propylene 9494X 1445 under $10^{-5}$ Torr at a deposition rate of 19 μg/cm$^2$ at 1430 (interface).

Step thirteen, after the vacuum deposition process of the fluorinated ethylene propylene 1445, the mask at 1440 (interface) is removed where a pattern of self-assembling monolayers 1435 (FOTS or tri-ethoxy) and fluorinated ethylene propylene 1445 is created on the top surface at 1430 (interface) of the silicate basecoat 1425 visible from 1440 (interface).

The super-hydrophobic coating detailed in this embodiment is less than 2 μm thick, translucent or opaque, particularly useful on optical components or any other applications not requiring an optically clear coating.

Patterned Transparent Vacuum Deposition Layer on Lotus Coating

Figure 15:
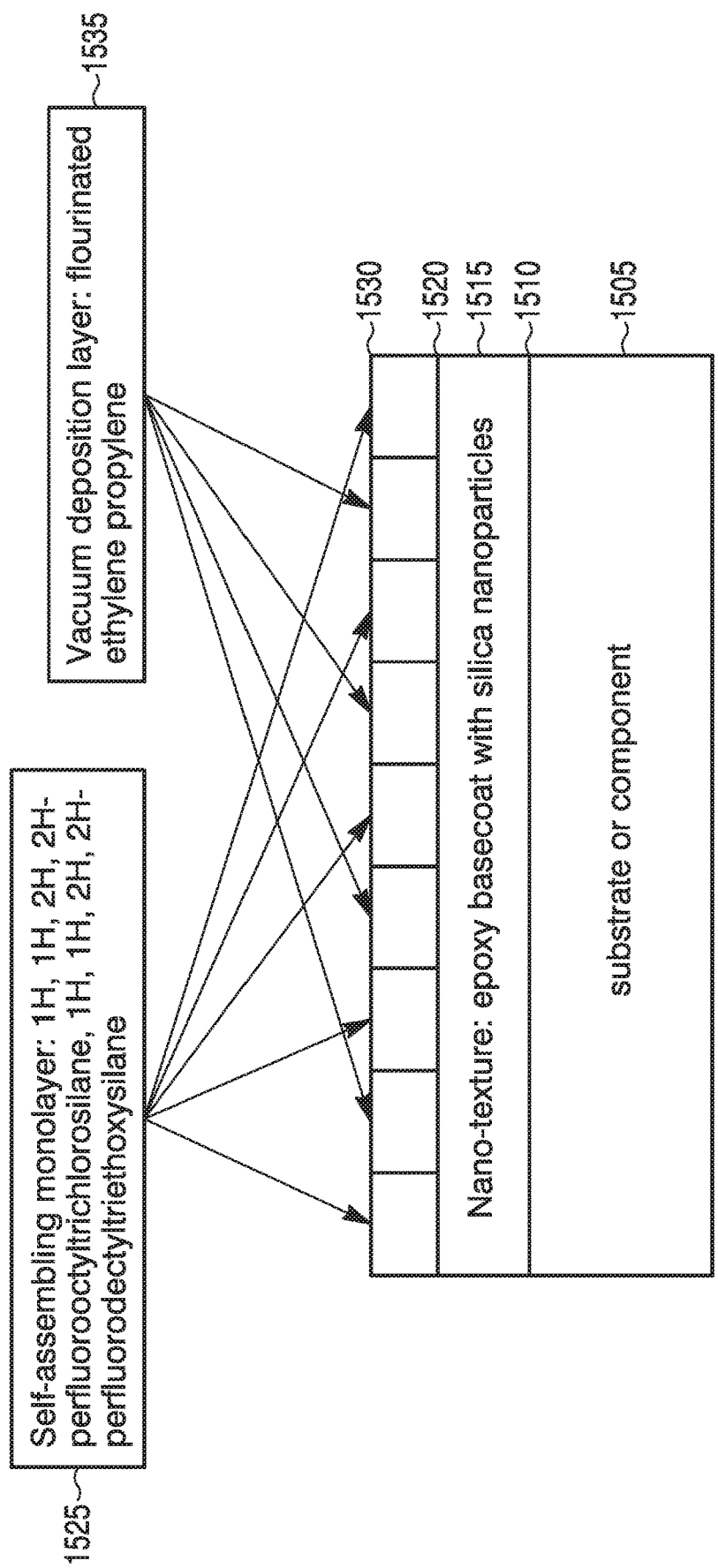
FIG. 15 is an illustration of another embodiment of a lotus coating with a patterned transparent vacuum deposition layer where the reference numerals 1515, 1525, and 1535 depict the coating layers, and the reference numerals 1510 and 1520 depict the interfaces between the coating layers and reference numeral 1530 depicts the exterior surface of the coating.

This embodiment of the Lotus Coating does not require a primer layer FIG. 15. The epoxy basecoat produces the nano-texture and preferably utilizes several sizes of nano-particles to produce a clumping effect to the texture per FIG. 3. A pattern of self-assembling monolayer and fluorinated ethylene propylene is created by using a masking process.

Step one entails the creation of a nano-texture epoxy basecoat 1515 (epoxy basecoat) by mixing 0.66 g of silica nanoparticles with an 8:1 ratio of 15 nm particles to 80 nm particles by mass to 0.4 ml of 4-to-1 tap epoxy resin, 0.1 ml of 4-to-1 tap epoxy hardener, and 50 ml of Optima™ grade acetone. The Optima™ grade acetone is used to dilute the mixture of the epoxy basecoat 1515. The epoxy basecoat 1515 produces the nano-texture and preferably utilizes several sizes of nano-particles to produce a clumping effect to the texture.

Step two, a glass bare substrate 1505 without the application of a primer layer is cleaned using standard low residue soap and distilled water at 1510 (interface). Next, the substrate 1505 is rinsed in acetone in preparation for the coating process at 1510 (interface). In this embodiment, glass was the desired substrate.

Step three, lint-free nonwoven cotton wipes are used to rub the epoxy basecoat 1515, from step one, unto the surface of the substrate at 1510 (interface), from step two. The application of the epoxy basecoat 1515 unto the substrate 1505 at 1510 (interface) induces the epoxy basecoat 1515 to flash off and turn matte in appearance. This rubbing process takes a minimum of 5 to 10 seconds to occur, but it may take longer. It should be noted that the application of the epoxy basecoat 1515 unto the substrate's surface at 1510 (interface) can be executed with other processes, such as spray coating, brushing, or spin coating. Next, once the epoxy basecoat 1515 becomes matte, a second set of dry lint-free nonwoven cotton wipes are used to thin out and render transparent the epoxy basecoat 1515. The thinning out process should occur within 10 minutes of the epoxy basecoat 1515 becoming matte; however, other application periods can be utilized. In addition, other processes can be used to thin the epoxy basecoat 1515 other than the use of second dry lint-free nonwoven cotton wipes.

Step four, the substrate 1505 coated with the epoxy basecoat 1515 from step three is baked at a temperature of 100° C. for 30 minutes to allow the coating to cure and set. The nano-texture epoxy basecoat 1515 curing temperature can vary depending on the amount of time and temperature applied. Curing temperatures can vary between 75° C. and 125° C. depending on the cure time used. Depending on the desired nano-texture, the epoxy basecoat 1515 can be applied in one or multiple layers.

Step five, after the baking process of the epoxy basecoat 1515 on the substrate 1505, a mask is placed on the top layer of the silicate basecoat 1515 at 1520 (interface) to create a pattern of FOTS or tri-ethoxy self-assembling monolayer 1525. The mask can be a screen, mesh, or other pattern. The masking process selectively exposes, in a pattern, sections of the top layer at 1520 (interface) of the epoxy basecoat 1515.

Step six, once the mask is placed on the top layer at 1520 (interface) of the epoxy basecoat 1515, the self-assembling monolayer 1525 is applied to the exposed section of the top layer at 1520 (interface) of epoxy basecoat 1515 providing super-hydrophobic properties at 1530 (interface). For optimization purposes, in an inert and dry environment, submerge completely the substrate 1505 with masked epoxy basecoat 1515 in a self-assembling monolayer 1525 solution consisting of n-decane containing 0.4% 1H, 1H,2H,2H-perfluorooctyltrichlorosilane (FOTS) by volume or tri-ethoxy for 30 minutes. The submersion or wetting process allows the self-assembling monolayer 1525 to develop.

Step seven, the coated substrate 1505, epoxy basecoat 1515, and mask at 1520 (interface) is removed from the self-assembling monolayer 1525 solution, and it is rinsed in the coming sequence of solutions at 1520 (interface) & 1530 (interface). The first solution used for rinsing the coated substrate 1505 with epoxy basecoat 1515, self-assembling monolayer 1525, and mask located at 1520 (interface) is n-decane; the second solution used for rinsing is chloroform, and the last solution is methanol.

Step eight, the rinsed substrate 1505, epoxy basecoat 1515, self-assembling monolayer 1525, and mask located at 1520 (interface) is then placed in an oven to bake in air at a temperature of 100° C. for 30 minutes. The baking process allows the super-hydrophobic FOTS or tri-ethoxy 1525 to align. The recommended baking temperature range should be between 75° C. to 125° C.

Step nine, after the baking process, the mask on top of the epoxy basecoat 1515 at 1520 (interface) is removed where the top layer at 1520 (interface) of the epoxy basecoat 1515 has patterns of self-assembling monolayers 1525 at 1530 (interface) (FOTS or tri-ethoxy) versus exposed epoxy basecoat 1515 at 1520 (interface). Next, another mask, screen, mesh, or other pattern is placed on top of the self-assembling monolayer 1525 (FOTS or tri-ethoxy) at 1530 (interface) exposing only the epoxy basecoat 1515 at 1520 (interface).

Step ten, after the masking process, to further optimize the durability, contact angle, and super-hydrophobic effects of the FOTS or tri-ethoxy self-assembling monolayer 1525, the coated substrate 1505, epoxy basecoat 1515, self-assembling monolayer 1525 (FOTS or tri-ethoxy) is placed in a vacuum deposition chamber. The top of the exposed epoxy basecoat 1515 at 1520 (interface) is coated with 100 nm of fluorinated ethylene propylene 9494X 1535 under $10^{-5}$ Torr at a deposition rate of 19 μg/cm$^2$ at 1520 (interface).

Step eleven, after the vacuum deposition process of the fluorinated ethylene propylene 1535, the mask at 1530 (interface) is removed where a pattern of self-assembling monolayers 1525 (FOTS or tri-ethoxy) and fluorinated ethylene propylene 1535 is created on the top surface at 1520 (interface) of the epoxy basecoat 1515 visible from 1530 (interface).

The super-hydrophobic coating detailed in this embodiment is less than 2 μm thick, transparent, and particularly useful on optical components or any other applications requiring a clear coating.

Figure 16:
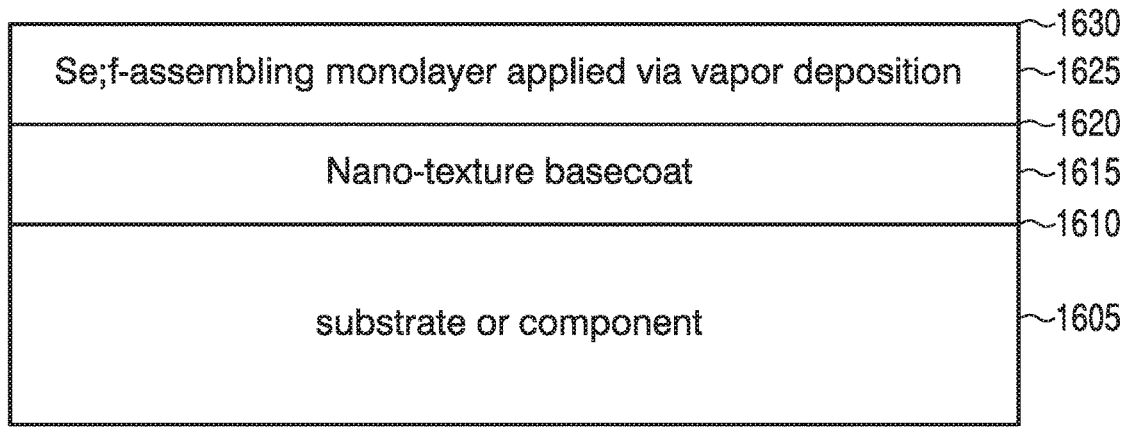
FIG. 16 is an illustration of another embodiment of a transparent lotus coating produced by the vapor deposition of a self-assembling monolayer where the reference numerals 1615 and 1625 depict the layers, and the reference numerals 1610 and 1620 depict the interfaces between the coating layers and reference numeral 1630 depicts the exterior surface of the coating.

Vapor Deposition of Self-Assembling Monolayer in Production of Transparent Lotus Coating In addition to the techniques described in the embodiments of Transparent Lotus Coatings, the self-assembling monolayer can be applied through a vapor deposition technique FIG. 16. The vapor deposition technique can enhance the clarity of the self-assembling monolayer. In this embodiment, the vapor deposited self-assembling monolayer can be applied directly after the application of the nano-textured layer epoxy basecoat. The vapor deposition process will replace and eliminate the dipping, submersion, spray coating, brushing, or spin coating steps in the wetting process of applying the self-assembling monolayer.

Step one of the vapor deposition process, after the epoxy basecoat 1615 is baked, entails cleaning an aluminum weighing boat, effusion cell, or other suitable container using isopropyl alcohol, or other appropriate solvent or cleaning material. This aluminum weighing boat will be used to contain the self-assembling monolayer 1625 in order to facilitate the evaporation or outgassing of the silane 1625.

Step two, after placing the aluminum weighing boat, 0.5 ml of 97% 1H,1H,2H,2-perfluorodecyltriethoxysilane 1625 (tri-ethoxy) or FOTS is poured into the aluminum boat, effusion cell, or suitable container.

Step three, the weighing aluminum boat, effusion cell, or suitable container containing the tri-ethoxy or FOTS is placed in a vacuum bell jar or other vacuum chamber, along with the substrate 1605, and previously applied epoxy basecoat 1615. A vacuum is pulled on the jar or chamber, until the approximate range of pressure is 10-100 Torr. The jar or chamber is sealed off from the vacuum pump and left undisturbed for 16 hours.

Step four, after the vapor deposition process, the jar or chamber is then vented with air. Next, the coated substrate 1605 with the epoxy basecoat 1615 and self-assembling monolayer 1625 is removed immediately to be placed in an oven. The coated substrate 1605 with the epoxy basecoat 1615 and self-assembling monolayer 1625 is baked for one hour at a temperature of 100° C.

The hydrophobic coating detailed in this embodiment is less than 2 μm, transparent, and particularly useful on optical components or any other applications requiring a clear coating.

Test Results

Figure 17:
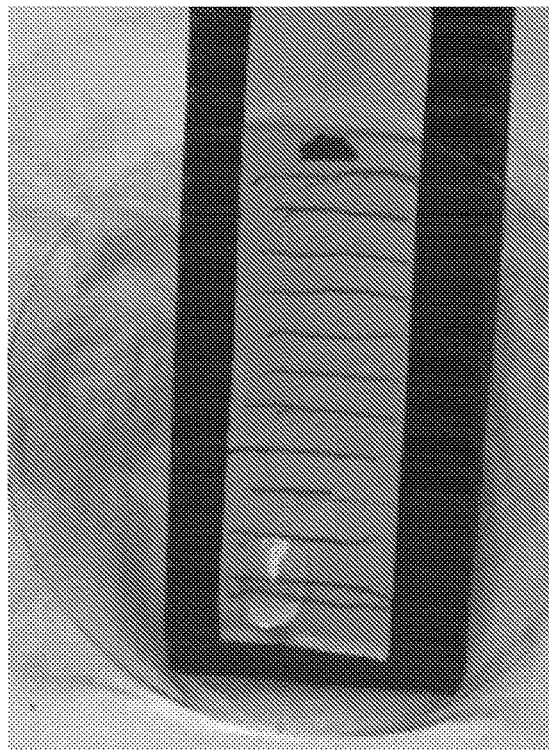
FIG. 17 shows the apparatus used to evaluate the sliding efficiency of droplet of numerous liquids sliding down the surface of a lens coated with embodiments of present invention.

FIG. 17 shows various embodiment of the WC2 and VAC processes coated on a lens increased the efficiency in self-cleaning of at least 50% to 100% of the herein embodiments for various liquids such as tap water, salt water with 10% salinity, 5% of Arizona dust in water, windshield washer fluid, antifreeze, power-steering fluid, Windex®, car wax, coffee with cream and sugar, gasoline, diesel, Armor All®, sun screen, anti-mosquito fluid, and hand lotion. An uncoated lens showed an efficiency of 12.66%. Table 2 shows the results of the efficiency achieved with the first row termed "coated" representing the WC embodiment. FIG. 18 shows pictures of the self-cleaning superior properties of the herein embodiment of a hydrophobic coating on a Ford F-150 lens cover untreated (left) and treated (right) where the treated lens self-cleans a droplet of bottle water.

TABLE 2

Efficiency of Embodiments to repel/self-clean a lens exposed to various droplets

| Lens | Average Efficiency in Repelling Droplets |
| --- | --- |
| Coated | 100.41 |
| WC 02 Gen 1 | 97.03 |
| WC 03 Gen 1 | 96.72 |
| WC 01 Gen 1 | 96.35 |
| VAC 01 Gen 1 | 92.04 |
| VAC 02 Gen 1 | 89.39 |
| WC 01 | 86.98 |
| VAC 03 Gen 1 | 86.81 |
| WC 03 | 86.50 |
| WC 07 | 83.24 |
| WC 09 | 82.71 |
| WC 02 | 80.91 |
| WC 06 | 79.28 |
| WC 04 | 76.48 |
| VAC 03 | 75.00 |
| WC 05 | 73.46 |
| WC 10 | 70.74 |
| VAC 10 | 70.45 |

TABLE 2-continued

Efficiency of Embodiments to repel/self-clean a lens exposed to various droplets

| Lens | Average Efficiency in Repelling Droplets |
|---|---|
| VAC 08 | 68.58 |
| VAC 06 | 66.94 |
| VAC 04 | 66.60 |
| VAC 07 | 66.49 |
| VAC 09 | 66.16 |
| VAC 02 | 63.87 |
| VAC 01 | 61.61 |
| WC 08 | 61.30 |
| VAC 05 | 57.25 |
| Uncoated | 12.56 |

Figure 19:
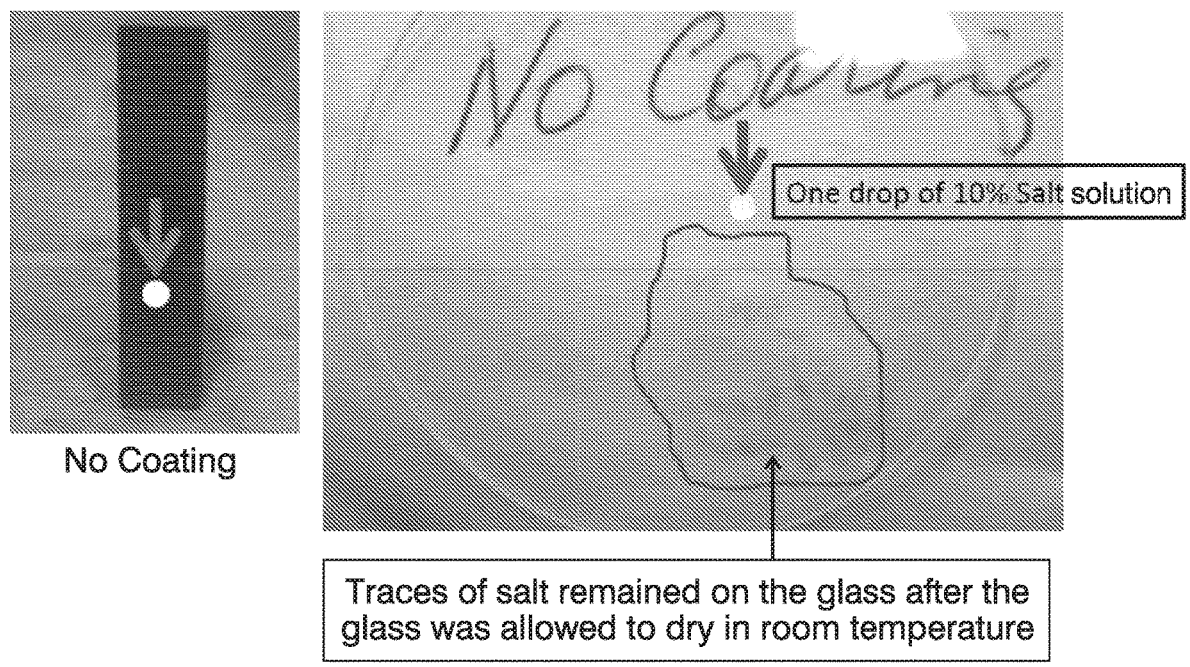
FIG. 19 shows a lens resting on a 60° incline structure where a drop of 10% salt solution is poured at room temperature onto the uncoated surface of the lens, and the salt residue from the salt solution remains on lens.
Figure 20:
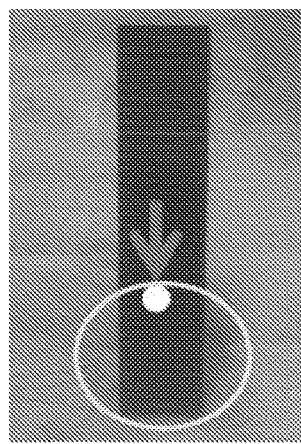
FIG. 20 shows a lens resting on a 60° incline structure where a drop of 10% salt solution is poured at room temperature onto the coated surface of the lens with one embodiment of invention's hydrophobic lotus coating (WC2) having a surface contact angle of 125°, and very little trace of the salt residue from the salt solution remains.
Figure 20:
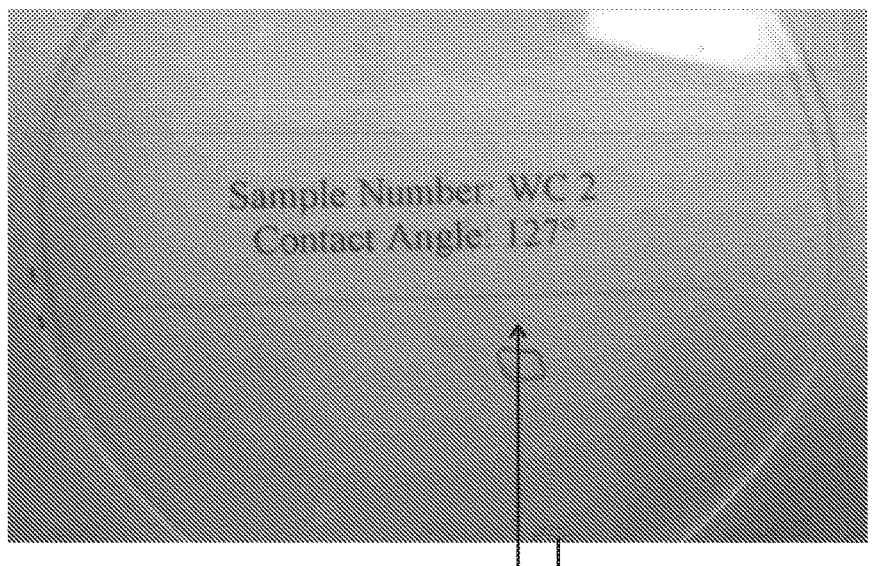
Figure 21:
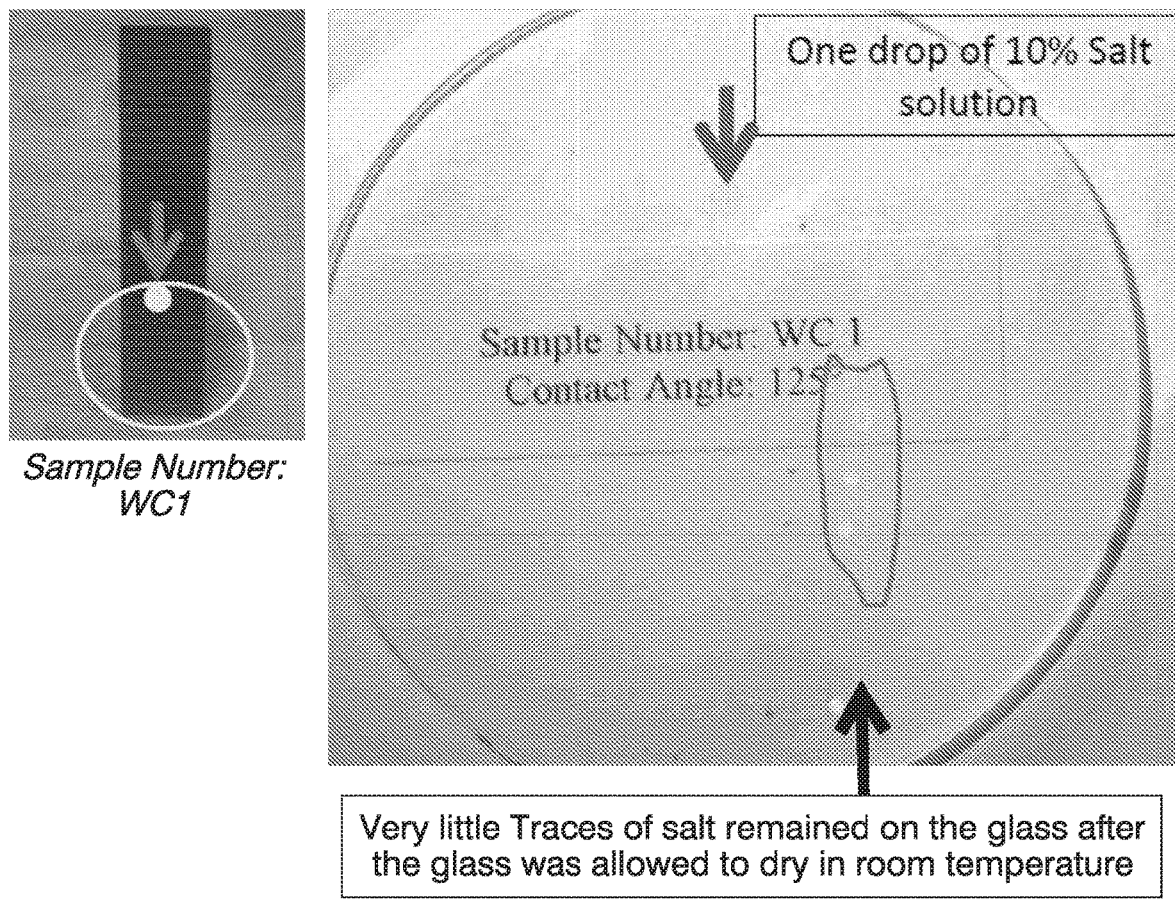
FIG. 21 shows a lens resting on a 60° incline structure where a drop of 10% salt solution is poured at room temperature onto the lotus coated surface of the lens with one embodiment of invention's hydrophobic lotus coating (WC2) having a surface contact angle of 127°, and almost none of the salt residue from the salt solution remains.

FIG. 19 shows how a drop of 10% salt solution poured on an uncoated glass lens on an incline of 60° at room temperature has a big area of residue remaining of the salt content. However, FIG. 20 shows the same glass lens coated with an embodiment WC2 of the herein invention with surface contact angle of 125° is capable of repelling a droplet of 10% salt solution at an incline of 60 degrees where a mall trace of residue remains on the coated glass lens. Finally, FIG. 21 shows even superior results with the same glass coated with an embodiment WC2 of the herein invention with surface contact angle of 127° repels almost all of the droplet of 10% salt solution at an incline of 60 degrees where almost none of the salt residue remains.

While the foregoing written description of the invention enables one of ordinary skill to make and use what is considered presently to be the best mode thereof, it should be understood that various changes, substitutions and alterations can be made herein without departing from the spirit and scope of the invention as defined by the appended claims. Therefore, the invention is not to be limited by the above described embodiment, method, and examples, but by all embodiments and methods within the scope and spirit of the invention as claimed.

What is claimed is:

1. A method of applying a hydrophobic dust mitigating transparent coating to a bare glass substrate; said method comprising the steps of:

mixing a nano-texture epoxy basecoat by mixing 0.66 g of silica nanoparticles with an 8:1 ratio of 15 nm particles to 80 nm particles by mass, with 0.4 ml of 4-to-1 epoxy resin wherein said resin includes about 80% oxirane, 2,2'-[(1-methylethylidene)bis(4,1-phenyleneoxymethylene)]bis-, homopolymer and at least 10% aliphatic glycidyl ether, with 0.1 ml of 4-to-1 epoxy hardener wherein said hardener includes 55-65% formaldehyde-phenol-triethylenetetramine copolymer and 15-20% triethylenetetramine and 15-20% Phenol, and 50 ml acetone;

cleaning said bare glass substrate without an application of a primer layer by using soap and distilled water and thereafter rinsing said bare glass substrate in acetone;

applying said nano-texture epoxy basecoat to said bare glass substrate by rubbing the nano-texture epoxy basecoat using a first set of lint-free nonwoven cotton wipes on to the surface of the bare glass substrate and allowing said nano-texture epoxy basecoat to flash off and turn matte in appearance and thereafter using a second set of dry lint-free nonwoven cotton wipes to thin out and render said nano-texture epoxy basecoat transparent;

baking said glass substrate and said nano-texture epoxy basecoat at a temperature of 100° C. for 30 minutes to allow the coating to cure and set;

applying a self-assembling monolayer to said nano-texture epoxy basecoat by submerging the glass substrate with the nano-texture epoxy basecoat in a self-assembling monolayer solution consisting of 200-proof ethanol and 0.4% 1H,1H,2H,2H-perfluorodecyltriethoxysilane by volume for at least 16 hours and thereafter removing said solution;

rinsing said self-assembling monolayer with 200-proof ethanol and thereafter blow drying with air;

then baking the dry coated glass substrate with the nano-texture epoxy basecoat and self-assembling monolayer in air at a temperature of 100° C. for 30 minutes thereby forming an aligned hydrophobic layer; and placing said glass substrate with the nano-texture epoxy basecoat and aligned hydrophobic layer in a vacuum deposition chamber and coating said aligned hydrophobic layer with 100 nm of fluorinated ethylene propylene under $10^{-5}$ Torr at a deposition rate of 19 μg/cm$^2$, whereby said method produces a transparent coating such that contacting water forms droplets having contact angles averaging 144°.

* * * * *